(12) United States Patent
Suzuki

(10) Patent No.: US 11,636,444 B2
(45) Date of Patent: Apr. 25, 2023

(54) RESOURCE RESERVATION SYSTEM, RESOURCE RESERVATION METHOD, AND NON-TRANSITORY COMPUTER-EXECUTABLE MEDIUM

(71) Applicant: Ryo Suzuki, Kanagawa (JP)

(72) Inventor: Ryo Suzuki, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 17/315,570

(22) Filed: May 10, 2021

(65) Prior Publication Data

US 2021/0357878 A1    Nov. 18, 2021

(30) Foreign Application Priority Data

May 15, 2020    (JP) .............................. JP2020-086312

(51) Int. Cl.
  *G06Q 10/1093*    (2023.01)
(52) U.S. Cl.
  CPC ................................ *G06Q 10/1095* (2013.01)
(58) Field of Classification Search
  CPC .................................................. G06Q 10/1095
  USPC ........................................................ 705/7.19
  See application file for complete search history.

(56) References Cited

U.S. PATENT DOCUMENTS

| 10,311,383 | B2* | 6/2019 | Holmes | ................ | G06Q 10/109 |
| 2018/0113897 | A1* | 4/2018 | Donlan | ................ | G06F 16/248 |
| 2020/0118045 | A1* | 4/2020 | Chung | ................ | G06Q 10/0631 |
| 2020/0242517 | A1* | 7/2020 | Navarro | ................ | G06K 7/1417 |

FOREIGN PATENT DOCUMENTS

| JP | 2014-059593 | 4/2014 |
| JP | 2016-004511 | 1/2016 |

OTHER PUBLICATIONS

NPL: Scheduling and Appointment Apps—Choosing and Using DottoTech May 11, 2015 https://www.youtube.com/watch?v=EYpcnQ08v-0 Retrieved on Jan. 25, 2023 (Year: 2015).*
EMS Software, Mobile App: Using a QR Code to Book a Meeting (Apr. 2017) https://www.youtube.com/watch?v=N1cfVgMMxzw (Year: 2017).*

* cited by examiner

*Primary Examiner* — Charles Guiliano
*Assistant Examiner* — Thea Labogin
(74) *Attorney, Agent, or Firm* — IPUSA, PLLC

(57) ABSTRACT

A resource reservation system includes a terminal apparatus including first circuitry; and an information processing apparatus including second circuitry. The first circuitry is configured to transmit, to the information processing apparatus, a request for a start of use of a resource, using an identification information of a user of the terminal apparatus. The second circuitry is configured to: in response to receiving the request for the start of use, in a case in which the identification information of the user is included in next reservation information after a time when the request is received and the resource is not reserved for the time when the request is received, advance a start time of a reservation of the next reservation information after the time when the request is received; and permit the start of use of the resource identified by the next reservation information in which the start time is advanced.

7 Claims, 16 Drawing Sheets

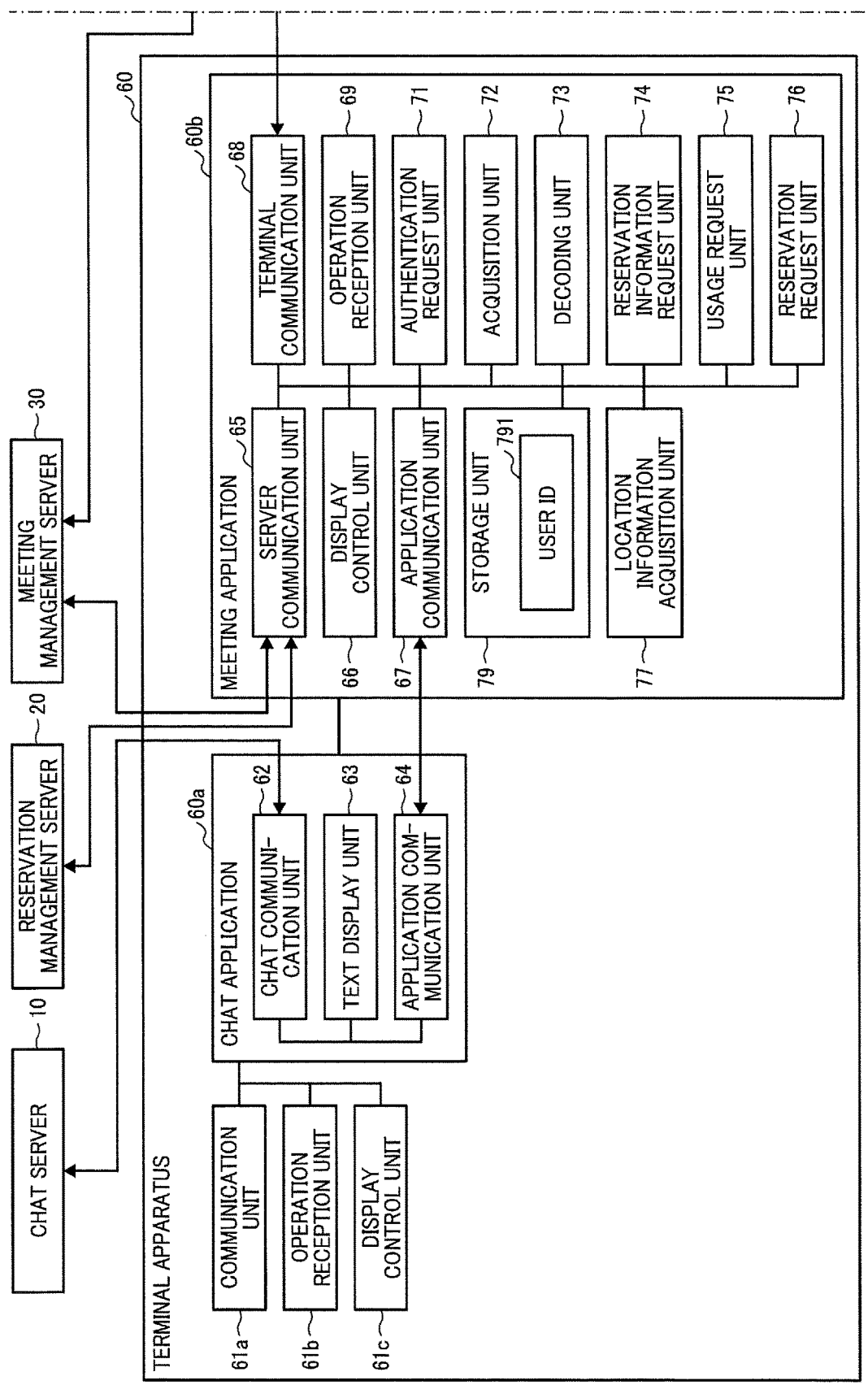

FIG. 12A

| TITLE | START TIME | END TIME | RESERVATION-MAKING USER | PARTICIPANT |
|---|---|---|---|---|
| (NO SCHEDULE) | 9:00 | 10:00 | | |
| XX REGULAR MEETING | 10:00 | 11:00 | Mr. A | Mr. B |
| Y MEETING | 11:00 | 12:00 | Mr. A | Mr. C |
| (NO SCHEDULE) | 12:00 | 13:00 | | |

FIG. 12B

| TITLE | START TIME | END TIME | RESERVATION-MAKING USER | PARTICIPANT |
|---|---|---|---|---|
| XX REGULAR MEETING | 9:00 | 10:00 | Mr. A | Mr. B |
| (NO SCHEDULE) | 10:00 | 11:00 | | |
| Y MEETING | 11:00 | 12:00 | Mr. A | Mr. C |
| (NO SCHEDULE) | 12:00 | 13:00 | | |

FIG. 12C

| TITLE | START TIME | END TIME | RESERVATION-MAKING USER | PARTICIPANT |
|---|---|---|---|---|
| MEETING | 9:00 | 10:00 | Mr. A | Mr. B |
| XX REGULAR MEETING | 10:00 | 11:00 | Mr. A | Mr. B |
| Y MEETING | 11:00 | 12:00 | Mr. A | Mr. C |
| (NO SCHEDULE) | 12:00 | 13:00 | | |

RESOURCE RESERVATION SYSTEM, RESOURCE RESERVATION METHOD, AND NON-TRANSITORY COMPUTER-EXECUTABLE MEDIUM

CROSS-REFERENCE TO RELATED APPLICATION

This patent application is based on and claims priority under 35 U.S.C. § 119(a) to Japanese Patent Application No. 2020-086312, filed on May 15, 2020, in the Japan Patent Office, the entire disclosure of which is incorporated herein by reference.

BACKGROUND

Technical Field

Embodiments of the present disclosure relate to a resource reservation system, a resource reservation method, and a non-transitory computer-executable medium.

Related Art

A technique in which an information processing terminal provided in a meeting room displays information relating to reservation of resources such as the meeting room is known. This technique allows a user to input the start of use of a meeting room to the information processing terminal when the user is going to start using the meeting room, and to input the end of use when the user is going to finish using the meeting room.

A technique is known that improves convenience when a user uses a meeting room reserved by the user. For example, a meeting room reservation system is known that includes a management server and a meeting room terminal provided at the entrance of a meeting room and communicable with the management server through a communication network. In such meeting room reservation system, a user holds an integrated circuit (IC) card over an IC card reader that the meeting room terminal includes to obtain authentication at the start of use of the meeting room.

SUMMARY

According to an embodiment, a resource reservation system includes a terminal apparatus including first circuitry, and an information processing apparatus including second circuitry. The first circuitry of the terminal apparatus is configured to transmit, to the information processing apparatus, a request for a start of use of a resource, using an identification information of a user of the terminal apparatus. The second circuitry of the information processing apparatus is configured to: in response to receiving the request for the start of use, in a case in which the identification information of the user is included in next reservation information after a time when the request is received and the resource is not reserved for the time when the request is received, advance a start time of a reservation of the next reservation information after the time when the request is received; and permit the start of use of the resource identified by the next reservation information in which the start time is advanced.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 7A and 7B (FIG. 7) are block diagrams illustrating an example of functional configurations of the terminal apparatus and the meeting room terminal, according to an embodiment of the present disclosure;

FIGS. 12A to 12C are diagrams each illustrating reservation information used for describing the reservation information screen, according to an embodiment of the present disclosure.

Figure 1:
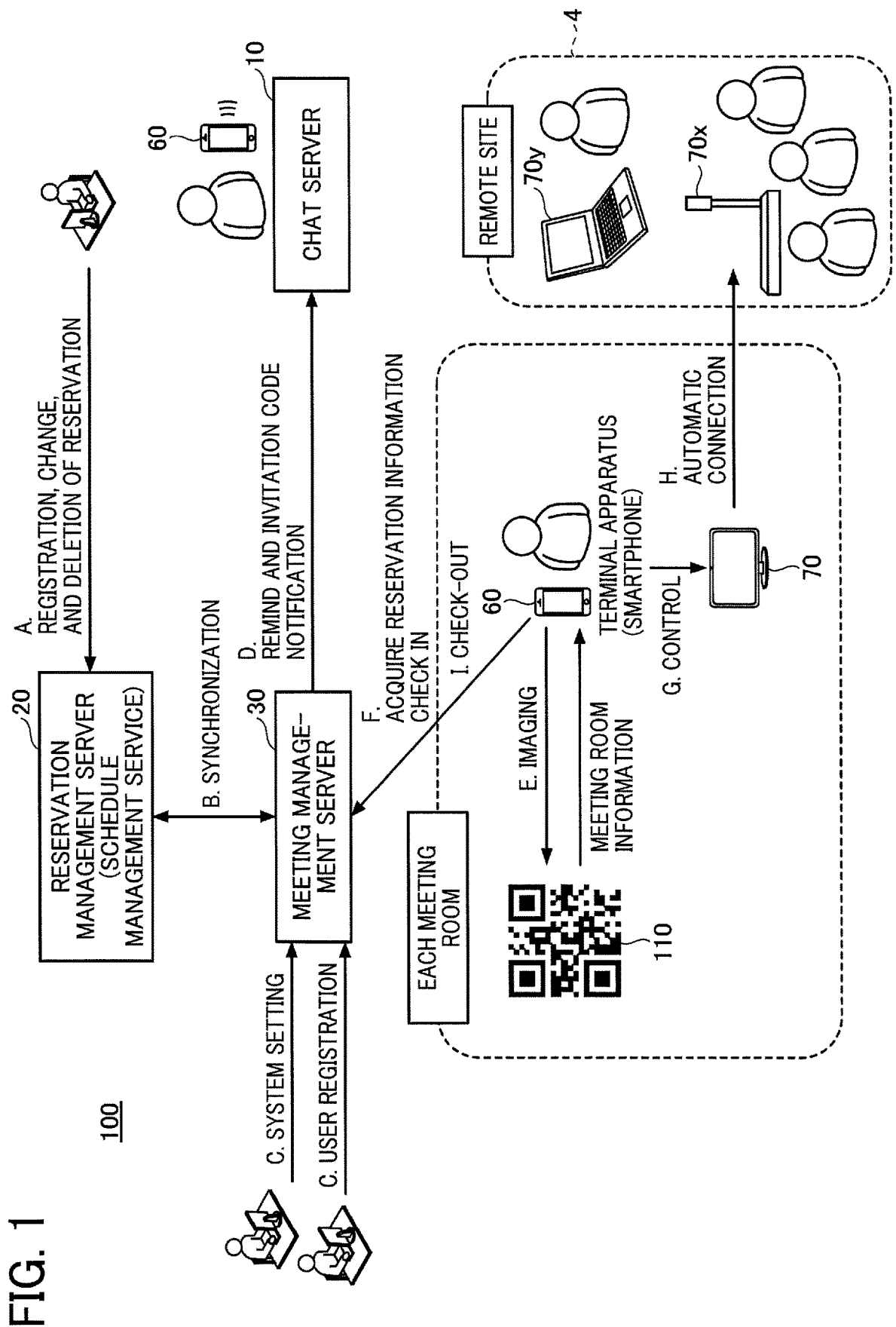
FIG. 1 is a diagram illustrating an overview of operation performed by a resource reservation system, according to an embodiment of the present disclosure.

The accompanying drawings are intended to depict embodiments of the present invention and should not be interpreted to limit the scope thereof. The accompanying drawings are not to be considered as drawn to scale unless

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, a description is given of a resource reservation system and a method of using a resource performed by the resource reservation system, according to example embodiments of the present disclosure.

Overview of Resource Reservation System:

First, a description is given of an overview of a resource reservation system 100 with reference to FIG. 1. FIG. 1 is a diagram illustrating an overview of operation performed by a resource reservation system 100.

A. A user who is to make a reservation operates his or her terminal apparatus 60 to communicate with a reservation management server 20, whereby reserving a meeting room. The user who makes a reservation may be referred to as a "reservation-making user", hereinafter. The reservation management server 20 is implemented by a general-purpose cloud service such as Office365 (registered trademark) and G Suite (registered trademark). In the reservation management server 20, meeting rooms of an organization such as a company to which the reservation-making user are registered.

B. A meeting management server 30 is a server that controls entire operation of the resource reservation system 100 based on a reservation status of the meeting rooms. The meeting management server 30 communicates with the reservation management server 20 at suitable timings to acquire reservation information, so that the reservation information is synchronized between the meeting management server 30 and the reservation management server 20.

C. An administrator or the like of the organization or the resource reservation system 100 performs user registration and configures various settings to the meeting management server 30. For example, the user registration refers to registering a user to whom various notifications are to be transmitted by a chat server 10 such as Slack (registered trademark), Line (registered trademark), and Microsoft Teams (registered trademark). Further, since the notifications are sent by a bot that transmits a message as the meeting management server 30, the bot provided by the chat server 10 is also registered. Examples of the various settings configured by the administrator or the like to the meeting management server 30 include registration of a meeting room terminal 90 (initial setting described below) and a setting of a timing when a reminder is to be sent.

D. When the current time is a predetermined time period before the start time of a meeting defined in the reservation information, the meeting management server 30 sends a reminder of the scheduled meeting to the reservation-making user. This reduces or prevents an empty reservation. The term "empty reservation" refers to reserving resources such as the meeting room that is not actually to be used. Further, the meeting management server 30 transmits a notification indicating an invitation code to the user as needed. The reservation-making user receives the reminder, and then stores, in the terminal apparatus 60, information (meeting identification information) for checking in the meeting room. The term "check-in", or the terms "to check in" refers to notifying the meeting management server 30 of the start of use of the meeting room and obtaining permission.

E. The user arrives at the meeting room to use the meeting room. An image code such as a quick response (QR) code (registered trademark) is provided and presented in the meeting room in advance. For example, a sheet on which the QR code is printed is attached at a given position in the meeting room. Meeting room information such as a meeting room identifier (ID), authentication key, and email address is encoded in the image code. The image code is provided for each resource and can be acquired for each resource. When the user photographs the image code using the terminal apparatus 60 on which a predetermined application operates, the meeting room information is decoded.

F. The user is authenticated by the meeting management server 30 through the terminal apparatus 60. The user is not required to enter the meeting identification information since the user has been authenticated. The terminal apparatus 60 starts communication with the meeting management server 30 using the meeting room ID acquired from the image code and a user ID identified by the authentication. This enables the terminal apparatus 60 to display reservation information of the meeting room in which the image code is presented, check in the meeting room, and make a reservation for the meeting room.

A description is now given of operations performed in different cases, e.g., the following three cases (i) to (iii).

(i) In a case in which the user is the reservation-making user or included in participants of the reservation information, and the meeting room is in a state of "waiting for check-in".

(ii) In a case in which the user is the reservation-making user or included in participants of the reservation information.

(iii) In a case in which the user is not the reservation-making user or not included in participants of the reservation information.

In the case of (i), the meeting management server 30 performs check-in processing. This allows the user to use the meeting room. In the case of (ii), the meeting management server 30 provides the reservation information without masking personal information. In the case of (iii), the meeting management server 30 provides the reservation information while masking the personal information. In the case of (ii) and (iii), a "use now" button is displayed together with the reservation information because the meeting room is not in a state of waiting for check-in.

In the case of (i), the operation is performed as the following steps G, H, and I. In the case of (ii) and (iii), the reservation information (reservation status of the meeting room) is displayed and the operation ends.

G. The internet protocol (IP) address of an electronic device 70 is registered in the meeting management server 30 in advance, and the meeting management server 30 transmits the IP address of the electronic device 70 to the terminal apparatus 60 in response to a check-in request (equivalent to a usage start request) or the like. The terminal apparatus 60 controls the electronic device 70 in the same or substantially the same manner as the meeting room terminal 90.

H. For example, in a case in which the electronic device 70 includes a videoconferencing function, the electronic device 70 communicates with an electronic device such as a videoconferencing terminal 70x at a remote site 4 to conduct a meeting (video meeting).

I. When the user is to finish the meeting, the user presses a predetermined button displayed on the terminal apparatus 60 to check out. The terminal apparatus 60 sends a request for check-out to the meeting management server 30 with designation of the meeting room information. Thus, the meeting management server 30 detects the check-out, and a next user can use the meeting room.

In Case in Which No Schedule is Registered for Current Time and User is Reservation-making User or Participant of Next Reservation:

In the case of (ii) and (iii), the use now button is displayed as described above. A description is now given in detail of the case (ii), i.e., in a case no schedule is registered for the current time and the user is the reservation-making user or participant of the next reservation.

A service providing system of the present embodiment allows a user to check in by photographing an image code with the terminal apparatus 60. The conventional service provision system allows the user to check in only when the resource reservation system is in a state of waiting for check-in. In view of such issue, in the present embodiment, when the resource reservation system is not in a state of waiting for check-in, the user can advance a reservation by using the use now button displayed in (ii).

First, in response to pressing of the use now button by the user, the meeting management server 30 determines whether the user is included in the first reservation among reservations registered for a time period after the time when the meeting management server 30 receives information indicating that the use now button is pressed. When the user is included in the next reservation, the meeting management server 30 advances the next reservation. In other words, the meeting management server 30 changes a start time of the reservation to the current time. Alternatively, the meeting management server 30 makes a new reservation for a different meeting. When the new reservation is made for the different meeting, the meeting management server 30 automatically checks the user into the original reservation. Conventionally, although the user presses the use now button to use the meeting room, the user sometimes does not perform the check-in operation for the reservation of the originally reserved time zone. In this case, the reservation is automatically canceled, whereby allowing a different user to make a reservation for the meeting room at the time zone that overlaps with the canceled reservation. In the present embodiment, when the meeting start time is advanced, the user does not conduct the meeting consecutively, whereby preventing the user from forgetting to perform the check-in operation. When the meeting management server 30 makes the new reservation for the different meeting, the meeting management server 30 automatically checks the user into the original reservation, whereby preventing the user from forgetting so that it is possible to prevent forgetting to performing the check-in operation.

Figure 2:
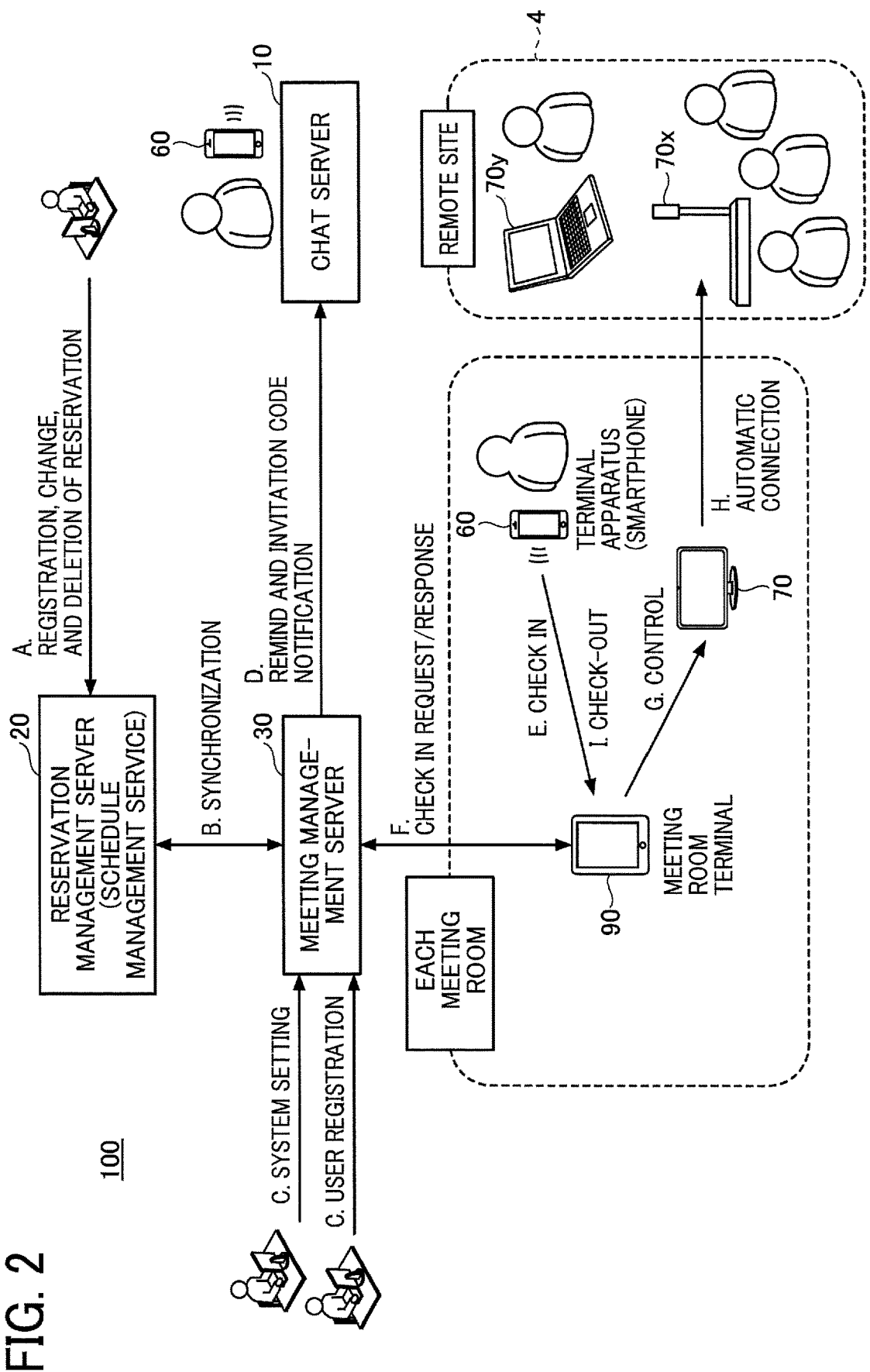
FIG. 2 is a diagram illustrating an overview of operation performed by the resource reservation system when a dedicated meeting room terminal is provided in a meeting room, according to an embodiment of the present disclosure.

Another Example Configuration:

FIG. 2 is a diagram illustrating an overview of an operation performed by the resource reservation system 100 when a dedicated meeting room terminal is provided in the meeting room. In FIG. 2, an operation of checking-in is different from that described above with reference to FIG. 1.

E. The meeting room terminal 90 is provided in each meeting room 6, and the meeting room terminal 90 periodically downloads reservation information for a meeting conducted in the corresponding meeting. The meeting room terminal 90 displays a schedule of the meetings to be conducted on the current day or a schedule of an upcoming meeting, thereby allowing participants of the meeting to confirm the schedule. The reservation-making user for the meeting room enters the meeting room 6 a little before the start time of the meeting to check in. For example, the reservation-making user checks in by inputting the meeting identification information to the meeting room terminal 90, or by holding the terminal apparatus 60 over the meeting room terminal 90 (to cause the meeting room terminal 90 to read the meeting identification information, or cause the terminal apparatus 60 to communicate with the meeting room terminal 90, etc.).

F. The meeting room terminal 90 transmits a check-in request to the meeting management server 30, and when the meeting room terminal 90 is authenticated with the meeting identification information, the meeting room terminal 90 receives from the meeting management server 30 a response indicating that the check-in has succeeded. The user also performs check-out operation to the meeting room terminal 90.

As described, the user can also check in by inputting the meeting identification information to the meeting room terminal 90. In the present embodiment, the description is given assuming that the configuration of FIG. 1 is adopted.

Terms Used in the Disclosure:

The term "resource" refers to any resource owned, rented, or managed by an organization or the like. Examples of resources owned, rented, or managed by an organization include meeting rooms, equipment, apparatuses, persons (groups), company cars, bicycles, locations such as parking lots, bicycle parking lots, free addresses, desks, or booths, remote meeting systems, printing services, and mechanisms. From among the resources, a resource that is difficult to move is referred to as a "facility". In the description of the present embodiment, for the sake of explanatory convenience, the term "meeting room" is used as an example of the resource. In addition, resources can be outside the organization, such as various electronic devices, parking lots, rental offices, rental studios, rental cycles, rental cars (sharing cars), accommodation facilities such as hotels, various facilities such as entertainment venues, rental lockers, and rental spaces.

The term "reservation-making user" refers to a person who reserved a meeting room. The term "participant" is a person who participates in a meeting, or a conference. The reservation-making user is usually included in the participants but may not be included. Persons who use a meeting room are simply referred to as users.

The term "start of use" refers to that the meeting management server 30 receives a request to start using a facility, and the user is allowed to start using the facility. In general, in order for the start of use to be permitted, the meeting management server 30 needs to confirm that the person is a legitimate reservation-making user or participant. From the user's point of view, if the user can check-in, the user is allowed to use the facility.

The term "end of use" refers to that the meeting management server 30 receives the end of use, extinguishes the right to use the facility granted to the user, and release the facility. The end of use corresponds to an operation for check-out from the user's point of view.

The use now button is a button that allows the user to reserve the meeting room when there is no reservation for the current time.

The term "advance a reservation" refers to change a start time to a time earlier than a start time of the current reservation. The term "ahead-of-schedule reservation" or "acceleration of reservation" may be used.

Figure 3:
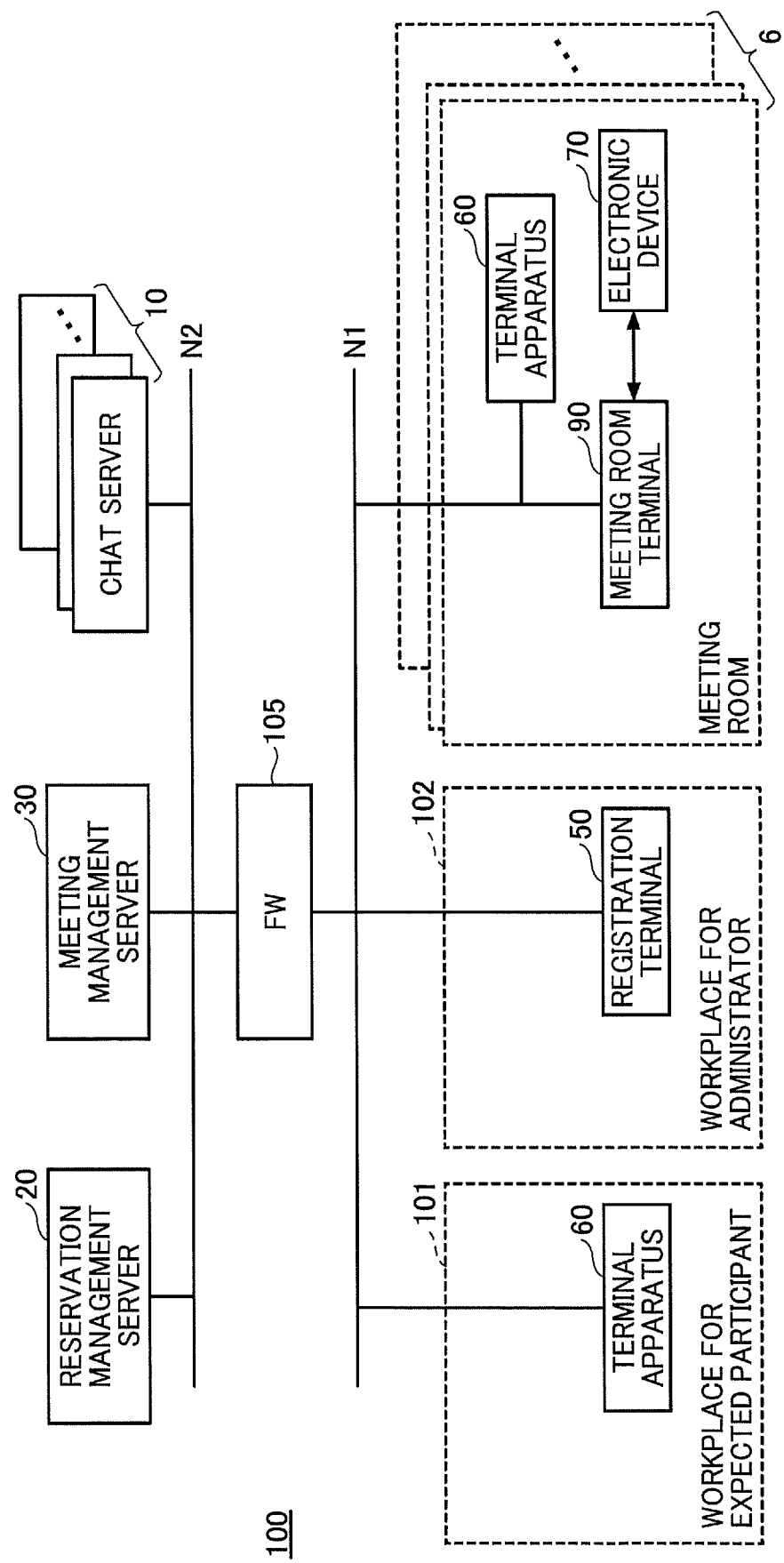
FIG. 3 is a schematic diagram illustrating an example of a system configuration of the resource reservation system, according to an embodiment of the present disclosure.

Example of System Configuration:

FIG. 3 is a schematic diagram illustrating an example of a system configuration of the resource reservation system 100, according to the present disclosure. The resource reservation system 100 is divided into an external network N2 and an intra-company network N1. The intra-company network N1 refers to an internal network, which is a network inside a firewall 105, and the external network N2 is a network such as the Internet through which unspecified volume of communication is transmitted.

The reservation management server 20, the meeting management server 30, and one or more chat servers 10 are connected to the external network N2. The servers communicate with one another as needed. Further, the terminal apparatus 60 operated by a participant attending a meeting can be connected to the external network N2 as needed.

The reservation management server 20 is implemented by one or more information processing apparatuses (a computer system), each being installed with a general-purpose server operating system (OS), for example. A system provided by the reservation management server 20 and relating to a reservation for each resource is referred to as a reservation management system. The reservation management server 20 includes a calendar system and provides a web application for managing various schedules. Specifically, the web application provides the following functions, for example:

To accept schedule registration, and enable a reservation-making user to confirm the reservation from anywhere at any time;

To send a reminder email at the preset date and time, such as 30 minutes before the scheduled time;

To enable one person to manage schedules using plural calendars (for business, for private, etc.); and To share a calendar with users belonging to the same group.

The reservation management server 20 manages users by accounts. The term "account" refers to a right of a user to use a service. In many systems, the user logs in to a system using the account. For this reason, the account has a function (function of identification information) to enable the system to uniquely identify the user. In the present embodiment, the reservation management server 20 transmits reservation information of the account (domain) registered in advance to the meeting management server 30. Alternatively, the meeting management server 30 requests the reservation information by designating the account of the reservation management server 20, to acquire the reservation information of the meeting room 6 from the reservation management server 20. The account can be any suitable information based on which a user can be uniquely identified. Examples of the account include an email address, an ID, and a telephone number.

Although in the present embodiment, a description is given of an example in which the reservation management server 20 manages the reservation of each meeting room 6 as a schedule, the reservation management server 20 is configured to manage reservation information of various types of schedules in addition to the reservation of each meeting room 6. Although G Suite (registered trademark), Office 365 (registered trademark), and the like are known as the reservation management system, any other suitable reservation management system having functions described in the present embodiment will suffice.

Further, in the present embodiment, information relating to the one or more meeting rooms 6 within the intra-company network N1 is registered in advance in the reservation management server 20. In other words, the web application of the reservation management server 20 is customized according to a meeting room name, a meeting room ID, a reservation available time, a capacity of each meeting room 6, a unit of reservation and the like of each meeting room 6 residing within the intra-company network N1 of a company using the resource reservation system 100. Accordingly, each meeting room 6 of the company using the resource reservation system 100 is associated with the reservation information.

The chat server 10 is implemented by one or more information processing apparatuses (computer system), each being installed with a general-purpose server OS, for example. A sharing system provided by the chat server 10 for sharing information such as text, audio, and video between plural users in real time is referred to as a chat system. The chat server 10 notifies the terminal apparatus 60 of information on the reservation of the meeting room 6. In the present embodiment, the resource reservation system 100 can include a plurality of chat servers 10 operated by different entities respectively.

The information to be shared includes image data, audio data, etc., in addition to text. In the present embodiment, a description is given of an example case in which text is mainly used for the notification, for the sake of explanatory convenience. For example, the chat system can provide a voice chat function through which members in a group have a communication with each other. The voice chat can be a one-to-one voice chat or a one-to-N voice chat, where N≥2. In other words, according to the present embodiment, the chat system notifies the information on the reservation of the meeting room 6 by outputting a voice message, in addition to or in alterative to, displaying text. LINE (registered trademark), Slack(registered trademark), Microsoft Teams (registered trademark) and the like are known as chat systems, but any chat system having a capability of transmitting notification to one or more users from a bot (a program that executes predetermined processes) will suffice.

The chat server 10 also manages a user by using an account, which is different from the account of the reservation management server 20. The meeting management server 30 is not basically required to recognize the account of the chat server 10. However, the meeting management server 30 can transmit a notification by designating a desired account of the chat server 10.

The meeting management server 30 is implemented by one or more information processing apparatuses (computer system), each including a general-purpose server OS, for example. As a process relating to the external network N2, the meeting management server 30 acquires the reservation information associated with the meeting room 6 from the reservation management server 20. Further, the meeting management server 30 acquires information on expected participants set in the reservation information and transmits a notification to a group associated with the expected participants (or to an individual user such as a user who made the reservation), in the chat server 10, at a time set in advance. As a process relating to the intra-company network N1, the meeting management server 30 manages a check-in and a check-out to and from the meeting room 6. Further, the meeting management server 30 turns on or off the electronic device 70, based on the reservation information associated with the meeting room 6 acquired from the reservation management server 20.

An expected participant can access the external network N2 through the intra-company network N1 from various locations such as the meeting room 6, a workplace 101 for an expected participant, a workplace 102 for an administrator, and the like using the terminal apparatus 60 in the intra-company network N1. Examples of the intra-company network N1 include a local area network (LAN). The meeting room 6, the workplace 101 for an expected participant, and the workplace 102 for an administrator are not necessarily in the LAN of the same company. In a case in which the terminal apparatus 60 is a mobile phone or a smartphone, the terminal apparatus 60 accesses the external network N2 through a telephone line, to connect to the reservation management server 20, the meeting management server 30, and the chat server 10. In this case, the user of the terminal apparatus 60 can connect to the external network N2 (internet connection) even when the user is not in the company.

In the meeting room 6, the meeting room terminal 90 and the electronic device 70 are provided. In the present embodiment, a method of using a meeting room in which the meeting room terminal 90 is not provided is described. As described with reference to FIG. 2, depending on the meeting room (resource), the meeting room is used by using the terminal apparatus 60 carried by each user instead of the meeting room terminal 90. The system can implement both the use of resources using the meeting room terminal 90 (resource terminal) and the use of resources using the terminal apparatus 60 carried by each user.

The meeting room terminal 90 and the electronic device 70 can communicate with each other through a small-scale LAN or a dedicated line. The electronic device 70 can connect to the intra-company network N1 and the external network N2 without intervening the meeting room terminal 90. The meeting room terminal 90 and the electronic device 70 can communicate with each other either wirelessly or by wire. Since the intra-company network N1 is inside the firewall 105, it is difficult to perform direct communication from the external network N2 to the intra-company network N1.

The meeting room terminal 90 is an information processing terminal operated by a meeting participant who uses the meeting room 6, such as the reservation-making user of the meeting. The meeting room terminal 90 is a reception terminal that receives the use of the meeting room. For example, the meeting room terminal 90 is provided on a desk in the meeting room 6 or at an entrance of the meeting room 6. A plurality of the meeting room terminals 90 can be provided in one meeting room 6. The meeting room terminal 90 is implemented by one or more information processing apparatuses (computer system), each being installed with a general-purpose OS, for example.

For example, the meeting room terminal 90 transmits the meeting room ID to the meeting management server 30, to display the reservation information associated with the meeting room 6, for the current day. Furthermore, the meeting room terminal 90 acquires control information such as turning on or off the electronic device 70 from the meeting management server 30. The meeting room terminal 90 turns on or off the electronic device 70 using the acquired control information.

The meeting room terminal 90 displays a standby screen for receiving an instruction for check-in, check-out, etc. Further, the meeting room terminal 90 communicates with the meeting management server 30, to notify the meeting management server 30 of the check-in or the check-out. In response to receiving the instruction for check-in, the meeting room terminal 90 transmits, to the meeting management server 30, meeting identification information that is input by the reservation-making user and a meeting room ID that the meeting room terminal 90 holds in advance. Based on the meeting identification information and the meeting room ID transmitted from the meeting room terminal 90, the meeting management server 30 can confirm that the user who made the reservation for the meeting room 6 uses the reserved meeting room 6.

The electronic device 70 is office equipment of various types that can be used in the meeting room 6. Examples of the electronic device 70 include an electronic whiteboard, a multifunction peripheral, a projector, a digital signage, and a digital camera. The electronic whiteboard includes a large-sized display that supports a touch panel system. The electronic whiteboard detects coordinates of a point pointed by the user on a board surface and displays a stroke by connecting the coordinates of the points. In addition, the electronic whiteboard is configured to display an image based on data output from a personal computer (PC) that is connected to the electronic whiteboard. Further, the electronic whiteboard is configured to communicate with other electronic whiteboard located in a remote site to share the displayed stroke in a synchronous manner. The electronic whiteboard can be referred to as an electronic information board, etc.

The multifunction peripheral has multiple functions, such as a copier function, a scanner function, a printer function, and/or a facsimile transmitting/receiving function. The multifunction peripheral is used for printing or copying documents, scanning documents for conversion to digital data, and faxing documents during the meeting. The projector is a device that projects an image. For example, the projector projects an image (still image or moving image) displayed on a display of the terminal apparatus 60 onto a screen, etc., to enable the participants to share the image. The digital signage is a large-sized display and is used for displaying any still images or moving images. The digital camera is used by each participant to capture an image formed on paper documents or presentation materials displayed on the electronic whiteboard for storage.

The terminal apparatus 60 communicable with the intra-company network N1 is provided in the workplace 101 for an expected participant. The terminal apparatus 60 can perform communication by wire or wirelessly. The terminal apparatus 60 is an information processing apparatus used when an expected participant (including a reservation-making user) reserves a meeting room. The expected participant (including the reservation-making user) can also use the terminal apparatus 60 in the meeting room. In other words, the terminal apparatus 60 is an information processing apparatus carried by the expected participant.

The terminal apparatus 60 is implemented by one or more information processing apparatuses (computer system), each being installed with a general-purpose OS, for example. Examples of the terminal apparatus 60 include a smartphone, a tablet terminal, a PC, a personal digital assistant (PDA), a wearable PC such as smart glasses and a smartwatch. Further, the terminal apparatus 60 can be any suitable device, terminal, or apparatus, provided that the device, terminal, or apparatus includes a communication capability and browser software or application software dedicated to the chat server 10, or the reservation management server 20 operates on the device, terminal, or apparatus. For example, the terminal apparatus 60 can be a car navigation system, a game console, a television receiver, and the like.

In the terminal apparatus 60, application software dedicated to the chat server 10 and application software dedicated to the resource reservation system 100 operate. The application software dedicated to the chat server 10 is referred to as a "chat application" hereinafter. The application software dedicated to the resource reservation system 100 is referred to as a "meeting application" hereinafter. Browser software can be substituted for either one or both of the chat application and the meeting application.

A registration terminal 50 communicable with the intra-company network N1 is provided in the workplace 102 for an administrator. The registration terminal 50 can perform communication by wire or wirelessly. The registration terminal 50 is a display terminal that allows the administrator to configure initial settings in the meeting room terminal 90.

The registration terminal 50 is implemented by the similar or substantially the similar information processing apparatus(es) that is implemented as the terminal apparatus 60. However, since the registration terminal 50 is used mainly by an administrator for configuring settings to the meeting management server 30, the chat application and the meeting application are optional. The registration terminal 50 communicates with the meeting management server 30 mainly by browser software and displays a web page.

Figure 4:
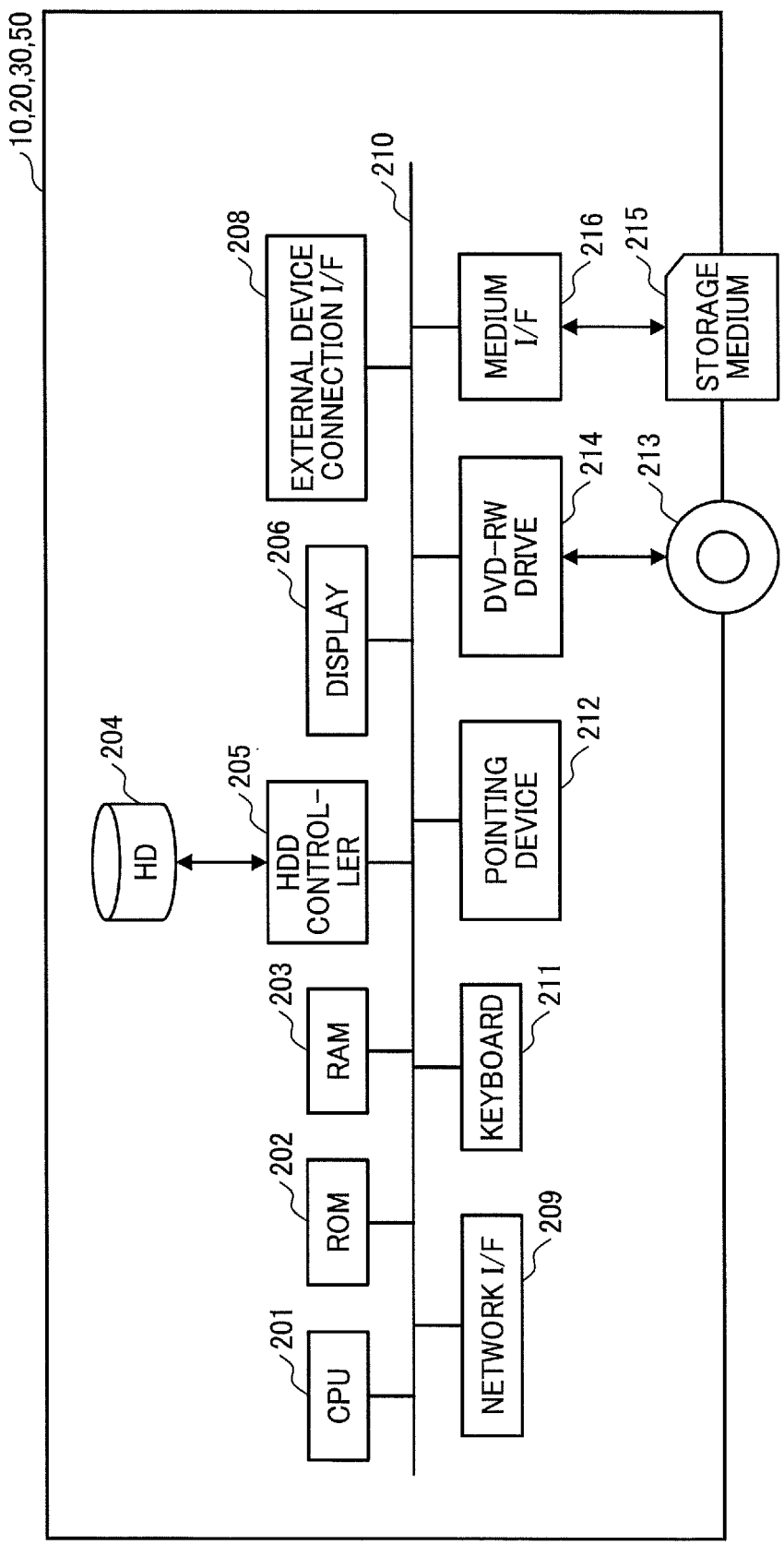
FIG. 4 is a block diagram illustrating an example of a hardware configuration of a computer system, according to an embodiment of the present disclosure.

Hardware Configuration:

Hardware Configuration of Meeting Management Server, Reservation Management Server, Chat Server, or Registration Terminal:

Each of the meeting management server 30, the reservation management server 20, the chat server 10, and the registration terminal 50 is implemented by, for example, a computer system having a hardware configuration illustrated in FIG. 4. FIG. 4 is a block diagram illustrating an example hardware configuration of a computer system according to the present embodiment.

As illustrated in FIG. 4, the computer system is implemented by a computer. The computer system includes a central processing unit (CPU) 201, a read only memory (ROM) 202, a random access memory (RAM) 203, a hard disk (HD) 204, a hard disk drive (HDD) controller 205, a display 206, an external device connection interface (I/F) 208, a network I/F 209, a bus line 210, a keyboard 211, a pointing device 212, a digital versatile disk rewritable (DVD-RW) drive 214, and a medium I/F 216.

Among these elements, the CPU 201 controls entire operation of the computer system. The ROM 202 stores a program such as an initial program loader (IPL) to boot the CPU 201. The RAM 203 is used as a work area for the CPU 201. The HD 204 stores various data such as a control program. The HDD controller 205 controls reading and writing of various data from and to the HD 204 under control of the CPU 201. The display 206 displays various information such as a cursor, menu, window, character, or image. The external device connection 208 is an interface that connects the computer system to various external devices. Examples of the external devices include, but are not limited to, a universal serial bus (USB) memory and a printer. The network I/F 209 is an interface that controls communication of data through a communication network. The bus line 210 is an address bus, a data bus, or the like, which electrically connects the elements in FIG. 4 such as the CPU 201.

The keyboard 211 is an example of an input device provided with a plurality of keys that allow a user to input characters, numerals, or various instructions. The pointing device 212 is an example of an input device that allows a user to select or execute a specific instruction, select a target for processing, or move a cursor being displayed. The DVD-RW drive 214 controls reading or writing of various data from or to a DVD-RW 513, which is an example of a removable storage medium. The removable storage medium is not limited to the DVD-RW and may be a digital versatile disk-recordable (DVD-R) or the like. The medium I/F 216 controls reading or writing (storing) of data from or to a storage medium 215 such as a flash memory.

Figure 5:
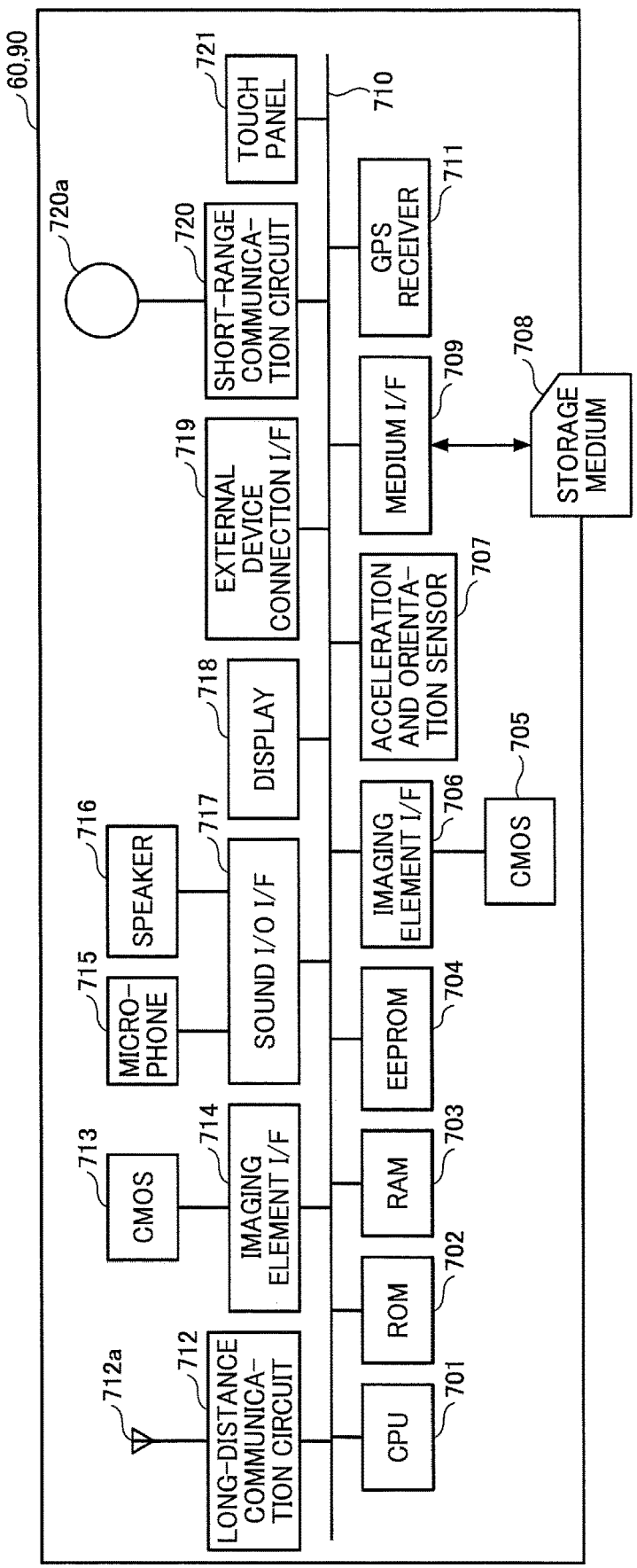
FIG. 5 is a block diagram illustrating an example of a hardware configuration of a meeting room terminal or a terminal apparatus, according to an embodiment of the present disclosure.

Meeting Room Terminal, Terminal Apparatus:

FIG. 5 is a block diagram illustrating an example of a hardware configuration of each of the meeting room terminal 90 and the terminal apparatus 60. FIG. 5 illustrates a hardware configuration of a tablet apparatus or a smartphone, as an example of the meeting room terminal 90 or the terminal apparatus 60.

The meeting room terminal 90 or the terminal apparatus 60 includes a CPU 701, a ROM 702, a RAM 703, an electrically erasable and programmable ROM (EEPROM) 704, a complementary metal oxide semiconductor (CMOS) sensor 705, an imaging element I/F 706, an acceleration and orientation sensor 707, a medium I/F 709, and a global positioning system (GPS) receiver 711.

The CPU 701 controls entire operation of the meeting room terminal 90 or the terminal apparatus 60. The ROM 702 stores a program such as an IPL to boot the CPU 701. The RAM 703 is used as a work area for the CPU 701. The EEPROM 704 reads or writes various data such as an application under control of the CPU 701. The CMOS sensor 705 is an example of a built-in imaging device that captures an object (mainly, a self-image of a user operating the meeting room terminal 90 of the terminal apparatus 60) under control of the CPU 701 to obtain image data. In alternative to the CMOS sensor, an imaging element such as a charge-coupled device (CCD) sensor can be used. The imaging element I/F 706 is a circuit that controls driving of the CMOS sensor 705. Examples of the acceleration and orientation sensor 707 include, but not limited to, an electromagnetic compass or gyrocompass for detecting geomagnetism and an acceleration sensor. The medium I/F 709 controls reading or writing (storing) of data from or to a storage medium 708 such as a flash memory. The GPS receiver 711 receives a GPS signal from a GPS satellite.

Further, the meeting room terminal 90 or the terminal apparatus 60 includes a long-range communication circuit 712, a CMOS sensor 713, an imaging element I/F 714, a microphone 715, a speaker 716, a sound input and output (I/O) I/F 717, a display 718, and an external device connection I/F 719, a short-range communication circuit 720, an antenna 720*a* for the short-range communication circuit 720, and a touch panel 721.

The long-range communication circuit 712 is a circuit that enables the meeting room terminal 90 or the terminal apparatus 60 to communicate with other device through the communication network. The CMOS sensor 713 is an example of a built-in imaging element that captures an object (mainly, a self-image of a user operating the terminal apparatus 60) under control of the CPU 701 to obtain image data. In alternative to the CMOS sensor, an imaging element such as a charge-coupled device (CCD) sensor can be used. The imaging element I/F 714 is a circuit that controls driving of the CMOS sensor 713. The microphone 715 is a built-in circuit that converts sound into an electric signal. The microphone 715 acquires voice and sound waves emitted from an external speaker, etc., and acquires information using electrical signals. The speaker 716 is a built-in circuit that generates sound such as music or voice by converting an electric signal into physical vibration. The sound I/O I/F 717 is a circuit for inputting or outputting an audio signal between the microphone 715 and the speaker 716 under control of the CPU 701. The display 718 is an example of a display device that displays an image of the object, various icons, etc. Examples of the display 718 include a liquid crystal display (LCD) and an organic electroluminescence (EL) display. The external device connection I/F 719 is an interface configured to connect the meeting room terminal 90 or the terminal apparatus 60 to various external devices. The short-range communication circuit 720 is a communication circuit that communicates in compliance with the near field communication (NFC), the Bluetooth (registered trademark), and the like. The touch panel 721 is an example of an input device that allows a user to operate the meeting room terminal 90 by touching a screen of the display 718. The imaging device such as the CMOS sensor 713, the short-range communication device such as the short-range communication circuit 720, the voice input device such as the microphone 715, and the like are information acquisition devices that acquire resource identification information by, for example, an image such as an image code, wireless communication, or sound waves.

Further, the meeting room terminal 90 or the terminal apparatus 60 includes a bus line 710. Examples of the bus line 710 include, but not limited to, an address bus and a data bus, which electrically connects the elements illustrated in FIG. 5 such as the CPU 701.

Figure 6A:
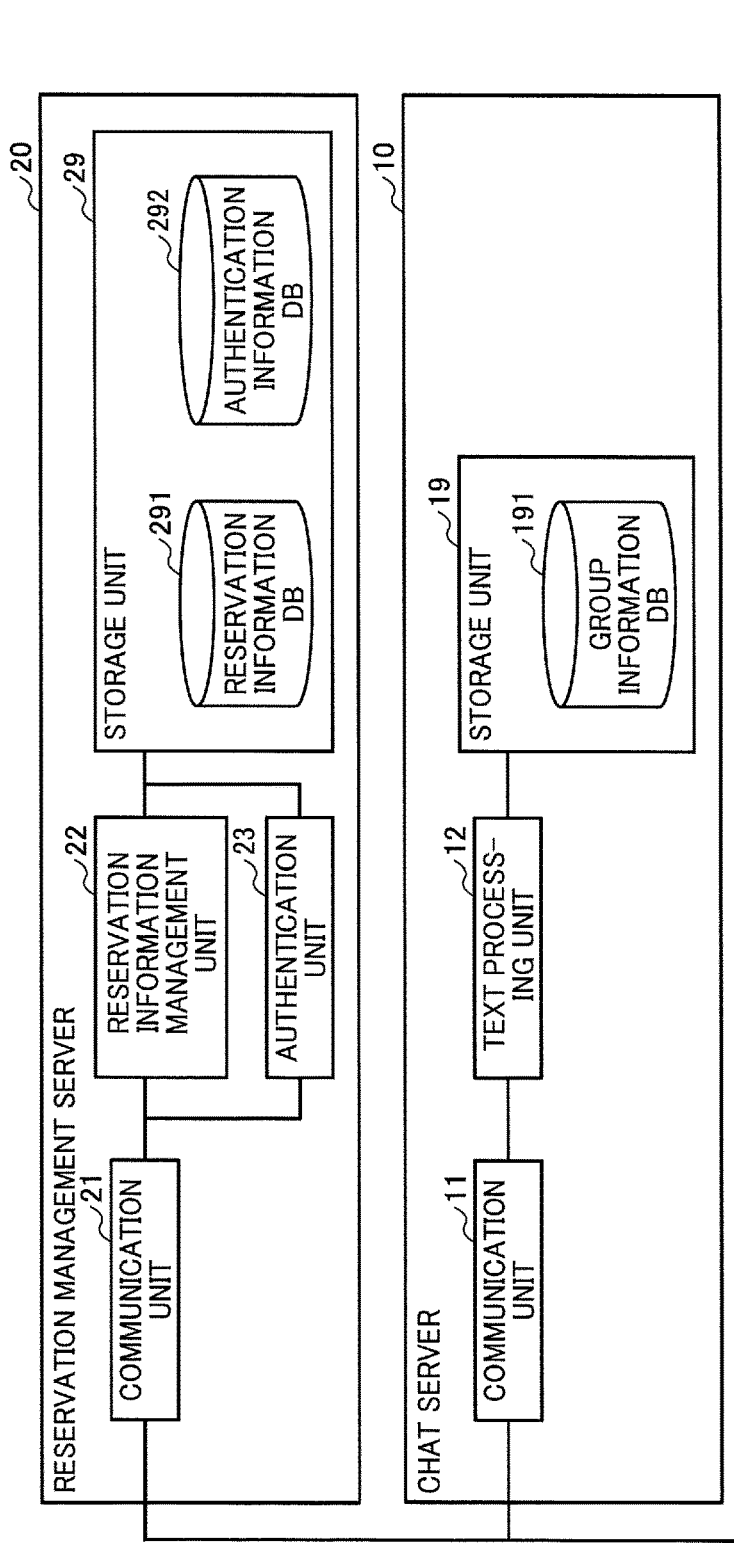
FIGS. 6A and 6B (FIG. 6) are block diagrams illustrating an example of functional configurations of a reservation management server, a chat server, and a meeting management server, according to an embodiment of the present disclosure.
Figure 6B:
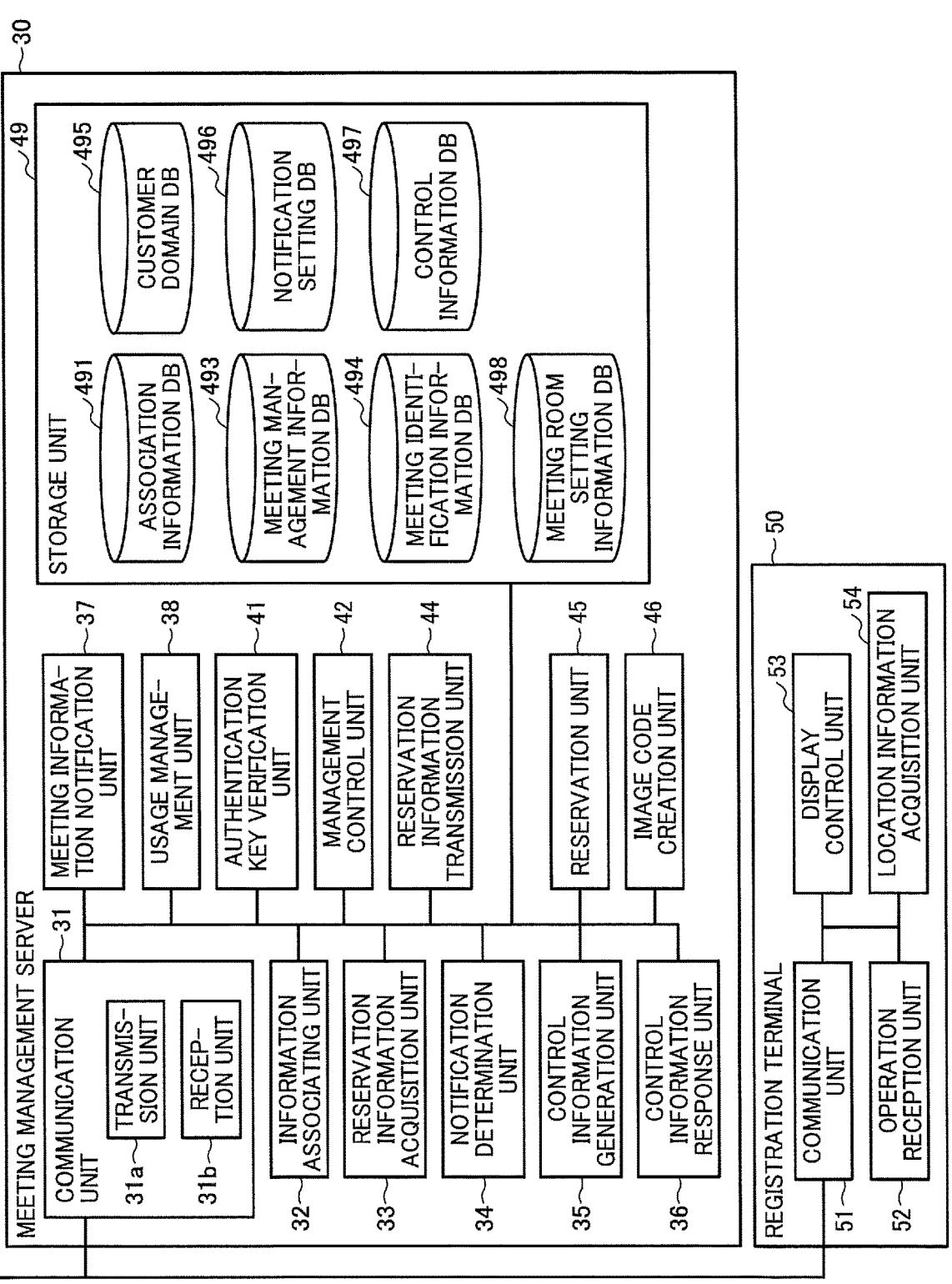

Functions:

FIGS. 6A and 6B (FIG. 6) are block diagrams illustrating an example of a functional configuration of the reservation management server 20, the chat server 10, the meeting management server 30, and the registration terminal 50.

Reservation Management Server:

The reservation management server 20 includes a communication unit 21, a reservation information management unit 22, and an authentication unit 23. These functional units of the reservation management server 20 are functions or means that are implemented by operating one or more hardware elements illustrated in FIG. 4 in cooperation with instructions of the CPU 201 according to the program loaded from the HD 204 to the RAM 203.

The communication unit 21 transmits and receives various types of information to and from the meeting management server 30 and the terminal apparatus 60. The communication unit 21 transmits screen information of a reservation setting screen to the terminal apparatus 60 and receives a reservation setting or an authentication request from the terminal apparatus 60. Further, the communication unit 21 transmits reservation information to the meeting management server 30.

The reservation information management unit 22 manages reservation information registered by a user. The reservation information management unit 22 reads the reservation information associated with the meeting room 6 requested from the meeting management server 30 from a reservation information database (DB) 291 and transmits the reservation information to the meeting management server 30 through the communication unit 21.

Alternatively, when the reservation information is registered (or changed), the reservation information is transmitted to the meeting management server 30 even if the request is not received. A general-purpose web application can be used to enable a user who is to make a reservation to register a reservation for the meeting room 6 with the reservation management server 20.

The authentication unit 23 authenticates the user based on authentication information (e.g., a user ID and password) stored in an authentication information DB 292. An integrated circuit (IC) card or biometric authentication information can be used for the authentication.

The reservation management server 20 further includes a storage unit 29. The storage unit 29 is implemented by, for example, the RAM 203, and/or the HD 204 illustrated in FIG. 4. The reservation information DB 291 and the authentication information DB 292 are stored in the storage unit 29.

TABLE 1

Reservation Information DB

| Reservation ID | Reservation-Making User Account | Meeting Name | Meeting Room ID | Start Time | End Time | Expected Participant Account |
|---|---|---|---|---|---|---|
| 001 | a@xfood.com | Product Z Development Meeting | K-001 | 2017 Jul. 7 10:00 | 2017 Jul. 7 12:00 | b@xfood.com c@xfood.com d@xfood.com |
| 002 | e@xfood.com | Product Y Development Meeting | K-001 | 2017 Jul. 7 13:00 | 2017 Jul. 7 14:00 | f@xfood.com g@xfood.com |
| ... | ... | ... | ... | ... | ... | ... |

Table 1 is an example of reservation information stored in the reservation information DB 291. The reservation information is information for managing a reservation state of the meeting room 6. The reservation information includes, for each of reservation IDs, an account of reservation-making user, a meeting name, a meeting room ID, a start time of the meeting, an end time of the meeting, and accounts of expected participants in association with the reservation ID. The reservation ID is identification information for identifying one record of the reservation information. ID is an abbreviation for "identifier," and indicates an identification or identification information. ID is any one of a name, a symbol, a character string, a numerical value, or a combination of at least two of these items, which is used for identifying a particular object from among a plurality of objects. The same applies to other IDs than the reservation ID. The account of the reservation-making user is an account of an expected participant who made a reservation for the meeting room 6. The meeting name is a name of a meeting, which is given by the expected participant at his or her choice. The meeting room ID is identification information for identifying the meeting room 6 that resides on the intra-company network N1. The start time is the beginning of a time slot during which the meeting room 6 is reserved. In other words, the start time is a time when the meeting is to be started. The end time is the end of the time slot during which the meeting room 6 is reserved. In other words, the end time is a time when the meeting is to be ended. The accounts of expected participants are accounts of invited members who are scheduled to attend the meeting. Each of the accounts in Table 1 is issued by the reservation management server 20.

TABLE 2

| Authentication Information DB | | |
|---|---|---|
| Customer ID | Password | User ID |
| G-001 | ********** | a@xfood.com |

Table 2 is an example of authentication information stored in the authentication information DB 292. The authentication information is information for a user (reservation-making user or participants) to log in to the reservation management server 20. The login information includes items of a user ID and a password. A successful authentication means that the user ID is valid. The user ID is the same as the account of the reservation-making user or each participant. Accordingly, the meeting management server 30 identifies by the user ID, whether the reservation information is of the reservation-making user or of participant.

Chat Server:

The chat server 10 includes a communication unit 11 and a text processing unit 12. These functional units of the chat server 10 are functions or means that are implemented by operating one or more hardware elements illustrated in FIG. 4 in cooperation with instructions of the CPU 201 according to the program loaded from the HD 204 to the RAM 203.

The communication unit 11 transmits and receives various types of information to and from the meeting management server 30. In the present embodiment, the communication unit 11 receives, from the meeting management server 30, information about reservation of a meeting room, information for identifying the bot, and information specifying a group as a destination to which a notification is to be sent. Examples of the information for identifying the bot include, but not limited to, a token described below. The information for identifying the bot is notified in advance as identification information of the bot from the chat server 10, when the bot of the meeting management server 30 is generated. Further, the communication unit 11 may receive information specifying an account of an individual such as a user who made the reservation. Furthermore, the communication unit 11 transmits, to the meeting management server 30, information indicating that an expected participant has read the information about the reservation of the meeting room or a response made by an expected participant to the displayed information about the reservation of the meeting room.

The text processing unit 12 transmits, to the expected participants belonging to the group, information on the reservation of the meeting room 6, based on the information transmitted from the meeting management server 30, i.e., the information identifying the bot and the information identifying the group as a notification destination. The information transmitted by the text processing unit 12 appears as information provided by the bot. In one example, the number of notifications transmitted by the text processing unit 12 is equal to the number of the expected participants. In another example, the notification is transmitted only to the reservation-making user or only to a user (or users) registered as a notification destination. In addition, information on the reservation of the meeting room 6 is transmitted only to a particular notification destination.

The text processing unit 12 is configured to send the notification as a so-called "push notification". An example of a mechanism implementing the push notification is as follows. A chat application 60a receives an ID (token) for a push notification from a server operated by a manufacturer of an OS. The server associates the token with a device (terminal apparatus 60). The chat application 60a registers the token and an account of the chat application 60a with the chat server 10. Since the chat server 10 identifies an account of the chat application 60a when sending a push notification, the token associated with the account is identified. The chat system designates the token and transmits a notification content to the server operated by the manufacturer of the OS. The server sends a push notification to a device (terminal apparatus 60) associated with the token.

The chat server 10 further includes a storage unit 19. The storage unit 19 is implemented by, for example, the RAM 203, and/or the HD 204 illustrated in FIG. 4. A group information DB 191 is stored in the storage unit 19.

TABLE 3

| Group Information DB | | | | | | |
|---|---|---|---|---|---|---|
| Workspace | Channel | Member Account 1 | Member Account 2 | Member Account 3 | Member Account 4 | Bot Account |
| http://sample.com/1 | #marketing | a@chat.com | b@chat.com | c@chat.com | d@chat.com | robo@chat.com |
| http://sample.com/2 | #team1 | b@chat.com | d@chat.com | | | |
| http://sample.com/3 | #ip | f@chat.com | g@chat.com | h@chat.com | | robo@chat.com |
| ... | ... | ... | ... | ... | ... | ... |

Table 3 is an example of group information stored in the group information DB 191. The group information is information in which accounts of members belonging to the same group are registered. In the group information, member accounts 1 to n (n=4 in Table 3) and a bot account are registered in association with a workspace and a channel.

The workspace is identification information for identifying an organization such as a company or a department. In the present embodiment, plural members belong to a workspace (for example, Company A). Examples of the workspace include a uniform resource locator (URL). Alternatively, any suitable information other than the URL is used as the workspace, provided that the information is unique. Further, the workspace has plural channels according to the purposes of chatting. The channel is a group of members among whom information to be shared is exchanged, such as a group for Product A and a group for Product B One or more members of the members belonging to the workspace belong to the channel. In other words, the notification destination is identified by the workspace and the channel. However, the notification destination is specified identified in different ways depending on what chat system is used for notification. Accordingly, if there is any identification information based on which a group is uniquely identified, such information can be used to identify the notification destination. In another example, three or more items of information can be used for identifying a group as the notification destination.

The channels are uniquely identified from one another. The member accounts 1 to n are accounts of members belonging to the channel. Each of these accounts is issued by the chat server 10. In the present embodiment, the bot is registered as a member for notifying other members belonging to the same group of information on the reservation of the meeting room 6. In other words, the bot is a kind of a proxy of the meeting management server 30 or a fictitious member. Comment (text) by the bot is transmitted to the terminal apparatus 60 of each of the member accounts 1 to n.

The workspace and channel are managed by the meeting management server 30. The workspace and channel are information for identifying the group to which the participant belongs.

Meeting Management Server:

The meeting management server 30 includes a communication unit 31, an information associating unit 32, a reservation information acquisition unit 33, a notification determination unit 34, a control information generation unit 35, a control information response unit 36, a meeting information notification unit 37, a usage management unit 38, an authentication key verification unit 41, a management control unit 42, a reservation information transmission unit 44, a reservation unit 45, and an image code creation unit 46. These functional units of the meeting management server 30 are functions or means that are implemented by operating one or more hardware elements illustrated in FIG. 4 in cooperation with instructions of the CPU 201 according to the program loaded from the HD 204 to the RAM 203. This program is distributed from a server for program distribution or distributed as stored in a storage medium.

The communication unit 31 transmits and receives various kinds of information to and from the reservation management server 20, the chat server 10, the registration terminal 50, and the terminal apparatus 60. The communication unit 31 includes a transmission unit 31a and a reception unit 31b. The reception unit 31b receives reservation information from the reservation management server 20 and receives a request for reservation information from the meeting room terminal 90 or the terminal apparatus 60. Further, the reception unit 31b receives a check-in request and a check-out request from the meeting room terminal 90 or the terminal apparatus 60. Furthermore, the reception unit 31b receives, from the registration terminal 50 operated by the administrator, information indicating an association between the group of the chat system and the account. The transmission unit 31a transmits information relating to reservation of a meeting room to the chat server 10 and transmits the reservation information to the meeting room terminal 90 or the terminal apparatus 60.

The information associating unit 32 mainly performs processing relating to a preliminary registration process. Specifically, the information associating unit 32 receives a registration of a domain from the registration terminal 50 or the like operated by the administrator and registers the domain with a customer domain DB 495. Further, the information associating unit 32 stores the workspace and the channel of the chat system transmitted from the registration terminal 50 or the like in association with the account of the reservation management server 20 in an association information DB 491.

The reservation information acquisition unit 33 acquires the reservation information from the reservation management server 20 by designating an account of a customer who uses the resource reservation system 100. The reservation information acquisition unit 33 registers the acquired reservation information as meeting management information with a meeting management information DB 493. Alternatively, the reservation information acquisition unit 33 receives the changed reservation information. Accordingly, at least a part of the reservation information stored in the reservation management server 20 is stored in the meeting management information DB 493. More specifically, the reservation information acquisition unit 33 acquires the reservation information for a predetermined period in the future from the current time among the reservation information stored in the reservation management server 20. The predetermined period is determined depending on how long a period ahead is set to future meetings for which the information on the reservation of the meeting room 6 is to be notified.

The notification determination unit 34 determines whether the meeting management information includes a reservation whose start time satisfies a condition for notification. For example, the notification determination unit 34 refers to a notification setting DB 496 to determine whether the current time matches a date and time obtained by subtracting a preset period from the start time of the reservation. When the current time matches the obtained date and time by this subtraction, the notification determination unit 34 determines that a notification is to be sent. For example, when there are plural bots according to different roles, such as a bot for sending a reminder and a bot for receiving a reservation, the notification determination unit 34 determines a suitable bot according to processing to be performed.

When the notification determination unit 34 determines that the notification is to be sent, the meeting information notification unit 37 designate information identifying the bot (e.g., a token in SLACK) and information identifying the group as the notification destination, to request the chat server 10 to transmit a notification of the information on the reservation of the meeting room 6. Note that the notification is performed several times, and the meeting identification information is included in at least one of the notifications. The meeting identification information is information for the meeting management server 30 to confirm whether the participant has a right to use the reserved meeting room 6 during the reserved time slot. The meeting information notification unit 37 generates the meeting identification information by the final notification at the latest. The meeting identification information is registered in a meeting identification information DB 494.

The control information generation unit 35 refers to the meeting management information to generate control information for the electronic device 70 and registers the generated control information in a control information DB 497. For example, the control information generation unit 35 generates control information for turning on the power of the electronic device 70 several minutes before the start time of the meeting. Further, the control information generation unit 35 generates control information for turning off the power of the electronic device 70 in response to detection of the check-out. The control information is stored in the control information DB 497.

In response to receiving an inquiry from the terminal apparatus 60 or the meeting room terminal 90 located in the meeting room 6 as to whether there is control information, the control information response unit 36 refers to the control information DB 497 to transmit the control information corresponding to the meeting room 6 to the terminal apparatus 60 or the meeting room terminal 90.

The usage management unit 38 manages check-in (start of use) and check-out (end of use) to and from the meeting room. Further, the usage management unit 38 registers, in the meeting management information DB 493, a change in the status of meeting according to the check-in and the check-out. The check-in is allowed, for example, from 5 to 10 minutes before the start time of the meeting identified by the reservation ID. Any desired value is set to this time period. Thereby, the status is changed to "waiting for check-in".

In response to receiving a check-in request from the meeting room terminal 90, the usage management unit 38 permits a check-in when a pair of the meeting room ID and the meeting identification information (invitation code) transmitted by the meeting room terminal 90 is registered in the meeting identification information DB 494.

In response to receiving a check-in request from the terminal apparatus 60, the usage management unit 38 receives the authentication key, the email address of the meeting room, the meeting room ID, and the user ID from the terminal apparatus 60. The usage management unit 38 authenticates that the image code has been captured (i.e., the user is present in the meeting room) using the authentication key. In addition, the usage management unit 38 identifies reservation information of the meeting room by the meeting room ID, and permits the check-in when the user ID is included in the account of the reservation-making user, (or the account of the expected participant) of the identified reservation information.

In response to receiving the pressing of the use now button of the meeting room terminal 90, the usage management unit 38 requests the reservation unit 45 to make a reservation. Based on the reservation information, the reservation unit 45 registers a new reservation of a certain time period (e.g., 30 minutes or 60 minutes) in the reservation management server 20 so that the new reservation does not overlap with the next reservation. Alternatively, the reservation unit 45 requests the reservation management server 20 to make a reservation for one unit of a predetermined time slot.

In response to receiving the pressing of the use now button from the terminal apparatus 60, the usage management unit 38 receives the authentication key, the email address of the meeting room, the meeting room ID, and the user ID from the terminal apparatus 60. The usage management unit 38 identifies a particular meeting room by the meeting room ID and identifies the earliest reservation information after the current time (the time when the request is received). When the same user ID is included in the account of the reservation-making user (or the account of the expected participant) of the identified reservation information, the usage management unit 38 requests the reservation unit 45 to advance the start time of the identified reservation information. The reservation unit 45 designates the reservation ID of the reservation information and requests the reservation management server 20 to change the start time to the current time. Alternatively, the usage management unit 38 requests the reservation unit 45 to make a new reservation between the current time and the start time of the next meeting. The reservation unit 45 sends a request for the new reservation to the reservation management server 20.

As a method for the usage management unit 38 to determine whether the check-in request is received from the meeting room terminal 90 or from the terminal apparatus 60, the meeting application 60*b* and the terminal application 90*a* may each notify the meeting management server 30 of the type of application. Alternatively, the meeting application 60*b* may notify the meeting management server 30 that the information is obtained from the image code at check-in. In addition, as long as the meeting room terminal 90 and the terminal apparatus 60 can be distinguished from each other, the usage management unit 38 can determine whether the check-in request is from the meeting room terminal 90 or from the terminal apparatus 60.

The usage management unit 38 cancels the reservation if the check-in is not permitted by a fixed time.

The authentication key verification unit 41 authenticates the meeting room terminal 90 or the terminal apparatus 60 depending on whether the authentication key transmitted from the meeting room terminal 90 or the terminal apparatus 60 matches the authentication key registered in the meeting room setting information DB 498. Therefore, only the meeting room terminal 90 having the valid authentication key or the terminal apparatus 60 that transmitted the valid authentication key can acquire the reservation information. In the present embodiment, since the terminal apparatus 60 can acquire the reservation information, a third party is prevented from acquiring the reservation information from the outside (a place where an image code is not present) by using the authentication key.

The management control unit 42 checks whether a management start flag registered in the meeting room setting information DB 498 is true or not for each meeting room. The management start flag is a flag indicating whether the management of the meeting room is ready to start.

The reservation information transmission unit 44 transmits the reservation information (meeting management information) stored in the meeting management information DB 493 in response to a request from the meeting room terminal 90 or the terminal apparatus 60. However, a management start flag is required to be set to True by the successful authentication by the authentication key. In response to the request from the terminal apparatus 60, the reservation information transmission unit 44 performs data processing on the meeting name and the reservation information depending on whether the user of the terminal apparatus 60 is a reservation-making user or a participant. For example, the reservation information transmission unit 44 masks the meeting room or the name. The reservation information transmission unit 44 can transmit the reservation information in Java Script Object Notation (JSON) format, Extensible Markup Language (XML) format, Comma-Separated Values (CVS) format, or the like. Since the reservation information is repeatedly transmitted, a format having a smaller data size is advantageous.

The meeting management server 30 further includes a storage unit 49. The storage unit 49 is implemented by, for example, the RAM 203 and/or the HD 204 illustrated in FIG. 4. The storage unit 49 stores the association information DB 491, the meeting management information DB 493, the meeting identification information DB 494, the customer domain DB 495, the notification setting DB 496, the control information DB 497, and the meeting room setting information DB 498.

TABLE 4

Association Information DB

| Workspace | Channel | Member Account 1 | Member Account 2 | Member Account 3 | Member Account 4 |
|---|---|---|---|---|---|
| http://sample.com/1 | #marketing | a@xfood.com<br>a@chat.com | b@xfood.com<br>b@chat.com | c@xfood.com<br>c@chat.com | d@xfood.com<br>d@chat.com |
| http://sample.com/2 | #team1 | f@xfood.com<br>f@chat.com | g@xfood.com<br>g@chat.com | h@xfood.com<br>h@chat.com | |
| . . . | . . . | . . . | . . . | . . . | . . . |

Table 4 is an example of association info nation stored in the association information DB 491. The association information is information associating the account of the reservation management system with the group of the chat system. The association information includes items of a workspace, a channel and member accounts 1 to n (n=4 in Table 4). The same description given above with reference to Table 3 of the workspace and the channel applies to the workspace and the channel of Table 4. In the member accounts 1 to n, the accounts of participants issued by the reservation management server 20 are registered. The accounts of the chat system can be also registered in the association information, as indicated in Table 4. To send a notification to the group, information identifying the account, issued by the reservation management server 20, of the user who has made a reservation of a meeting to the reservation management server 20 and information (in the present embodiment, the workspace and the channel name) identifying the group and channel of the notification destination will suffice. In other words, the accounts of all the members belonging to the group are not necessarily registered in the association information. However, the account information of the chat system of each individual user is required when sending a notification to the individual user. Accordingly, the account of the user of the chat system can be also registered in the association information, as indicated in Table 4.

TABLE 5

Meeting Management Information DB

| Reservation ID | Account of Reservation-Making User | Meeting Name | Meeting Room ID | Start Time | End Time | Account of Expected Participant | Status |
|---|---|---|---|---|---|---|---|
| 001 | a@xfood.com | Product Z Development Meeting | K-001 | 2017 Jul. 7 13:00 | 2017 Jul. 7 14:00 | b@xfood.com<br>c@xfood.com<br>d@xfood.com | Checked-in |
| 002 | e@xfood.com | Product Y Development Meeting | K-001 | 2017 Jul. 7 14:00 | 2017 Jul. 7 15:00 | b@xfood.com<br>c@xfood.com<br>d@xfood.com | Notification Sent |

Table 5 is an example of the meeting management information stored in the meeting management information DB 493 of the meeting management server 30. Since the reservation information is included in the management information stored in the meeting management information DB 493, in the following description of Table 5, differences from the reservation information DB 291 of Table 1 are described. The meeting management information in Table 5 includes "status" as an item. The status indicates the status of a reservation. For example, the status registered in the meeting management information of Table 5 indicates whether a notification of the information on the reservation of the meeting room 6 has been sent, whether the use of the meeting room has been confirmed, whether the check-in operation has been performed, whether the check-out operation has been performed, or whether the reservation has been cancelled.

TABLE 6

Meeting Identification Information DB

| Reservation ID | Meeting Room ID | Meeting Identification Information |
|---|---|---|
| 001 | K-001 | 1234 |
| 002 | K-002 | 5678 |
| . . . | . . . | . . . |

Table 6 is an example of meeting identification information management information stored in the meeting identification information DB 494. The meeting identification information management information is information for managing the meeting identification information for each reservation of the meeting room 6. The meeting identification information management information includes items of the reservation ID, the meeting room ID, and the meeting identification information. The reservation ID, the meeting room ID, and the meeting identification information of the meeting identification information management information in Table 6 are the same or substantially the same as those of the reservation information (the reservation information acquired from the reservation management server 20), which further includes the status. Accordingly, the redundant descriptions thereof are omitted. Note that the reservation ID is registered in order to identify the reservation of the same meeting room 6.

TABLE 7

| Customer Domain DB | |
|---|---|
| Customer Domain Name | Customer Administrator's Account |
| xfood.com | a@xfood.com |
| ycar.com | f@ycar.com |
| ... | ... |

Table 7 is an example of customer domain information stored in the customer domain DB 495. The customer domain information is information for managing a customer's domain name and an account of an administrator of the customer. The customer domain information stores the domain name of the customer in association with the administrator's account. The domain name of the customer in Table 7 is the domain name of the account (email address) issued by the reservation management server 20. The administrator's account is the account of the administrator (representative) of the customer. The reservation management server 20 issues the accounts in Table 7.

TABLE 8

| Notification Setting DB | |
|---|---|
| Customer Domain Name | Notification Setting |
| xfood.com | 1 day before |
| ycar.com | 12 hours before |
| ... | ... |

Table 8 is an example of notification setting information stored in the notification setting DB 496. The notification setting information includes, for each of the customers, settings relating to a notification. The notification setting information stores the domain name of the customer in association with notification settings. The notification setting indicates a time at which the information on the reservation of the meeting room 6 is to be notified. In this example, the timing defines how long ahead the start time of the meeting the notification of the information on the reservation of the meeting room is to be sent. In another example, a fixed date and time can be set in the notification settings. Further, the number of the timings set in the notification settings is not necessarily one. A plurality of notification settings can be registered in association with one customer.

TABLE 9

| Control Information DB | |
|---|---|
| Meeting Room ID | Control Setting |
| K-001 | Power ON |
| K-002 | Power OFF |
| ... | ... |

Table 9 is an example of control information stored in the control information DB 497. The control information is information for controlling the electronic device 70 provided in the meeting room 6. The control information includes items of the meeting room ID and a control content. The control content indicates a specific control operation of the electronic device 70. The meeting management server 30 sets details as a control setting for each electronic device 70. The control information does not include information indicating a time at which the electronic device 70 is to be controlled. This is because it is difficult for the meeting management server 30 to access the meeting room terminal 90 or the terminal apparatus 60, since the meeting management server 30 resides on the external network N2. Accordingly, the meeting management server 30 transmits the control content when the control information has already been generated and when being accessed from the meeting room terminal 90 or the terminal apparatus 60.

TABLE 10

| Meeting Room Setting Information DB: | | | | | | | | |
|---|---|---|---|---|---|---|---|---|
| Customer ID | Meeting room name | Meeting room ID | Status of meeting room terminal | Authentication key | Management start flag | Number of registrable meeting room terminals | Email address | Location |
| G-001 | Meeting room A | K-001 | Connected | ***** | True | 1 | K_001 @xfood.com | Latitude, Longitude |
| | Meeting room B | K-002 | Before Setup | ***** | False | 1 | K_001 @xfood.com | Latitude, Longitude |
| | Meeting room C | K-003 | Disconnected | ***** | True | 2 | K_001 @xfood.com | Latitude, Longitude |

Table 10 is an example of the meeting room setting information stored in the meeting room setting information DB 498. The meeting room setting information indicates settings for each meeting room. The meeting room setting information includes, in association with the customer ID, items of a meeting room name, the meeting room ID, a state of the meeting room terminal, an authentication key, a management start flag, the number of meeting room terminals that can be registered, an email address, and location information. The meeting room name is a general-purpose name of a meeting room recognized by participants attending in the meeting. Examples of the meeting room name include a name that is presented at the entrance of the meeting room. The meeting room ID is identification information for uniquely identifying a meeting room, as described above. In one example, the meeting room ID is common to the meeting room setting information and the reservation management server 20, to simplify the configuration and operation. In another example, a conversion table is provided that allows the administrator to set the different meeting room ID from that stored in the reservation management server 20. The meeting room ID is encoded into an image code presented in the meeting room. The state of the meeting room terminal indicates whether the configuration of initial settings of the meeting room terminal 90 has been completed, whether communication is possible, and the like. In a meeting room where the meeting room terminal 90 is not provided, the state of the meeting room is indicated as "before setup". The term "initial settings" refers to, for example, communication-related settings configured by a person so that the meeting room terminal 90 can exhibit at least the minimum functions. "Connected" in the state of the meeting room terminal indicates a state in which communication is confirmed within a certain time period. The state transitions to the "connected" from the "before setup" or "disconnected" due to communication. "Before setup" in the state of the meeting room terminal indicates a state in which the initial settings have not been configured yet. "Disconnected" in the state of the meeting room terminal indicates a state in which no communication has been performed for equal to or longer than a certain time period. (When no communication has been performed for equal to or longer than the certain time period, the state transitions to the "disconnected" from the "Connected"). The authentication key is authentication information used by the meeting management server 30 to authenticate the meeting room terminal 90 or the terminal apparatus 60. The authentication key is set to the meeting room terminal 90 by the initial settings. The authentication code is encoded in an image code presented in the meeting room in a meeting room where the meeting room terminal 90 is not located. The authentication key is a combination of numbers, alphabets, symbols, and the like that are too long to be identified by brute force attack. In one example, the meeting management server 30 determines the authentication key. In another example, the administrator determines the authentication key. The management start flag is a flag indicating whether the meeting management server 30 starts managing the meeting room after the initial settings of the meeting room terminal 90 has been configured. The value "true" set in the management start flag indicates that the meeting management server 30 starts managing the meeting room. The value "false" set in the management start flag indicates that the meeting management server 30 does not start managing the meeting room. The management start flag is set by the administrator. In a meeting room where the meeting room terminal 90 is not located, the administrator may set the management start flag to True as appropriate.

When the management start flag is set to True, the meeting management server 30 is ready to manage the meeting room. The meeting management server 30 starts the management of the meeting room when the management start flag is True and the request for reservation information is received from the meeting room terminal 90 or the terminal apparatus 60. As a result, transmission of reservation information is started when there is a request from the meeting room terminal 90 or the terminal apparatus 60.

When the meeting room terminal 90 acquires the reservation information from the meeting management server 30, the meeting room terminal 90 starts cooperation with the meeting management server 30. Therefore, the start of cooperation and the start of management are triggered by the related processes of requesting reservation information and transmitting reservation information.

The following processing is performed when cooperation is started, or management is started.

Display of reservation information (check-in, check-out, extension, use now)

Control of electronic devices linked to check-in and check-out

Automatic cancellation of reservation

Note that "extension" indicates that the participant extends the reservation beyond the end time of the reservation of the meeting room, and "use now" indicates that any user can use a vacant meeting room without reservation.

The management start flag substantially eliminates inconveniences such as automatic cancellation caused by a time lag between the time when the configuration of the initial settings is completed and the time when the meeting room terminal 90 is arranged in the meeting room. Since the management start flag is set to True even in the meeting room where the meeting room terminal 90 is not located, the reservation information can be displayed or automatically canceled. The number of meeting room terminals that can be registered indicates the number of meeting room terminals 90 that can be associated with one meeting room. It suffices that one meeting room terminal 90 is provided in one meeting room. However, in a case where any error occurs in the meeting room terminal 90, the user will have difficulty in checking in the meeting room until the repair of the meeting room terminal 90 is done. To address such situation, the administrator may want to associate plural meeting room terminals 90 with one meeting room. Therefore, even if the authentication key is revealed, since the terminal ID matches and the number of the meeting room terminals 90 is set in advance, reservation information is prevented from being revealed. The default value of the number of the meeting room terminals 90 can be either one or n (n≥2). The email address is for the meeting management server 30 or the like to send an email to the meeting room. In the present embodiment, the email address may be used as a meeting room ID. The email address is encoded into the image code presented in the meeting room. The location information indicates a location where the registration terminal 50 is present at a time when the image code creation unit 46 creates the image code presented in the meeting room. The location information is transmitted from the registration terminal 50 at the time when the image code creation unit 46 creates the image code presented in the meeting room. Accordingly, the location information indicates a location of the meeting room.

In one example, the meeting room name and the meeting room ID are determined in advance. In another example, the administrator sets the meeting room name and the meeting room ID. In still another example, the meeting room name and the meeting room ID transmitted from the reservation management server 20 are used. The default value (the value immediately after setting by a provider) of the state of the meeting room terminal is "before setup". However, the value automatically transitions according to the communication state. The value of the authentication key is assigned and set by the meeting management server 30 at the time of initial settings, for example. The management start flag is set by the administrator through a setting screen for the administrator. The value of the number of meeting room terminals that can be registered is also set by the administrator. In most cases, the value of the number of meeting room terminals that can be registered is equal to or more than one. When the value of the number of meeting room terminals that can be registered is set to one, only one meeting room terminal 90 can be registered in one meeting room. The email address can be set by the administrator.

When the administrator sets the meeting room ID, the authentication key, and the email address, the image code of the meeting room information including the meeting room ID, the authentication key, and the email address can be printed from a printer or the like. It is preferable that the meeting room information is encrypted so that a third party cannot obtain the reservation information at the time of leakage.

Registration Terminal:

The registration terminal 50 includes a communication unit 51, an operation reception unit 52, a display control unit 53, and a location information acquisition unit 54. These functional units of the registration terminal 50 are functions or means that are implemented by operating one or more hardware elements illustrated in FIG. 4 in cooperation with instructions of the CPU 201 according to the program loaded from the HD 204 to the RAM 203. The program (e.g., a browser application) is distributed from a server for program distribution or distributed as stored in a storage medium.

The registration terminal 50 is a terminal for the administrator to configure various settings related to the meeting room through the web page provided by the meeting management server 30. One of these settings is the initial settings. The terminal apparatus 60 may be used for the initial settings.

The communication unit 51 transmits and receives various kinds of information to and from the meeting management server 30 and the reservation management server 20. The operation reception unit 52 receives various operations that are input by the participant to the registration terminal 50. The display control unit 53 interprets screen information of various screens to display screens on the display 206. The operation reception unit 52 and the display control unit 53 includes, for example, a browser function and can execute a web application. The location information acquisition unit 54 acquires the location information of the registration terminal 50. In one example, the location information is acquired by the global navigation satellite system (GNSS). In another example, the location information is identification information of an access point such as Wi-Fi.

Figure 7B:
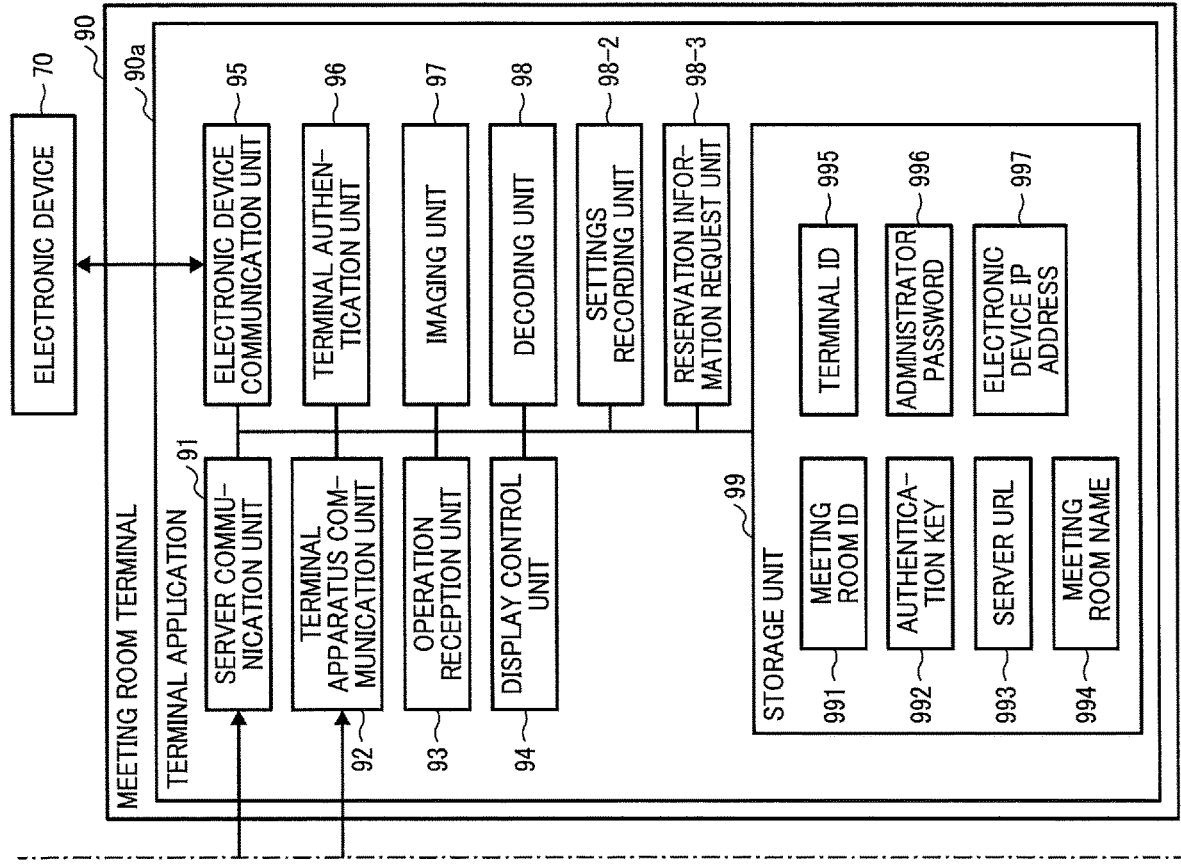

Terminal Apparatus:

FIGS. 7A and 7B (FIG. 7) are block diagrams illustrating an example of a functional configuration of the terminal apparatus 60 and the meeting room terminal 90. The functions of the electronic device 70 are described as needed.

The terminal apparatus 60 includes a communication unit 61*a*, an operation reception unit 61*b*, a display control unit 61*c*, a chat application 60*a*, and a meeting application 60*b*. The chat application 60*a* includes a chat communication unit 62, a text display unit 63, and an application communication unit 64. The meeting application 60*b* includes a server communication unit 65, a display control unit 66, an application communication unit 67, a terminal communication unit 68, an operation reception unit 69, an authentication request unit 71, an acquisition unit 72, a decoding unit 73, a reservation information request unit 74, a usage request unit 75, a reservation request unit 76, and a location information acquisition unit 77. These functional units of the terminal apparatus 60 are functions or means that are implemented by operating one or more hardware elements illustrated in FIG. 5 in cooperation with instructions of the CPU 701 according to the program loaded from the EEPROM 704 to the RAM 703. The program is distributed from a server for program distribution or distributed as stored in a storage medium. Since the chat application 60*a* and the meeting application 60*b* operate on the terminal apparatus 60, the program includes the chat application 60*a* and the meeting application 60*b*.

The communication unit 61*a* transmits and receives various types of information to and from the meeting management server 30 and the reservation management server 20. The operation reception unit 61*b* receives various operations that are input by the participant to the terminal apparatus 60. The display control unit 61*c* interprets screen information of various screens to display screens on the display 718. The operation reception unit 61*b* and the display control unit 61*c* includes, for example, a browser function and executes a web application.

The chat communication unit 62 of the chat application 60*a* transmits and receives various types of information to and from the chat server 10. In the present embodiment, the chat communication unit 62 receives information related to the reservation of the meeting room 6 from the chat server 10. Further, the chat communication unit 62 sends, to the chat server 10, a notification indicating that a message of the information on the reservation of the meeting room 6 has been read and a notification indicating whether the meeting room 6 is to be used or canceled.

The text display unit 63 of the chat application 60*a* displays text (the information related to the reservation of the meeting room 6) transmitted from the chat server 10. For example, the text display unit 63 displays the text as if the source of the message is the bot and as if the bot inputs the text.

The application communication unit 64 of the chat application 60*a* invokes the meeting application 60*b* and transmits the meeting identification information to the meeting application 60*b*. The chat server 10 transmits information identifying the meeting application 60*b* to the terminal apparatus 60, when notifying the terminal apparatus 60 of the information on the reservation of the meeting room 6. Accordingly, the chat application 60*a* designates the meeting application 60*b* to the OS and requests notification of the meeting identification information. The OS activates the meeting application 60*b*.

The server communication unit 65 of the meeting application 60*b* communicates with the meeting management server 30 or the reservation management server 20. The server communication unit 65 receives reservation information, and transmits a check-in request, a check-out request, and a reservation request to the meeting management server

30. Further, the server communication unit 65 transmits an authentication request to the reservation management server 20.

The display control unit 66 of the meeting application 60b controls the display 718 of the meeting room terminal 90 to display an image code or the like including the meeting identification information, when the meeting identification information is not input manually. When the terminal apparatus 60 receives the reservation information from the meeting management server 30, the display control unit 66 controls the display 718 to display the reservation information.

The application communication unit 67 of the meeting application 60b obtains various kinds of information from the chat application 60a through the OS. Examples of the various kinds of information obtained from the chat application 60a include the meeting identification information included in the information on the reservation of the meeting room 6.

The terminal communication unit 68 communicates with the meeting room terminal 90 to transmit, for example, the meeting identification information, in a case in which the meeting room terminal 90 is provided in the meeting room. (However, the meeting identification information may be entered manually). The terminal communication unit 68 detects the meeting room terminal 90 using a short-range wireless communication network such as Bluetooth (registered trademark). In response to detecting the meeting room terminal 90, the terminal communication unit 68 transmits the meeting identification information to the detected meeting room terminal 90. The operation reception unit 69 receives various operations performed input to the terminal apparatus 60.

The authentication request unit 71 designates a user ID or password entered by the user, and requests, via the server communication unit 65, the reservation management server 20 to perform authentication. When the authentication is successful, a user ID 791 is stored in the storage unit 79.

The acquisition unit 72 captures the image code presented in the meeting room and acquires image data of the image code. A barcode can be used instead of the image code. Alternatively, the acquisition unit 72 reads characters and numbers instead of the image code by optical character reader (OCR). In another example, the acquisition unit 72 acquires the meeting room information in other manners. For example, the acquisition unit 72 can acquire the meeting room information from an IC card or a Bluetooth (registered trademark) terminal provided in the meeting room. In other words, the acquisition unit 72 can acquire the meeting room information not only by capturing the image conde but also by short-range wireless communication.

The decoding unit 73 decodes the image code captured by the acquisition unit 72 to restore the meeting room information. In a case in which the image code is encrypted, the decoding unit 73 decrypts the image code.

The reservation information request unit 74 can automatically request the reservation information from the meeting management server 30 without any operation in conjunction with the capturing of the image code. Alternatively, the reservation information request unit 74 can request the reservation information according to a user's operation after the capturing of the image code.

The usage request unit 75 requests the meeting management server 30 to check-in to the meeting room in conjunction with the capturing of the image code or in response to the user's operation. The reservation request unit 76 requests the reservation management server 20 to make a new reservation for the meeting room.

The location information acquisition unit 77 acquires the location information of the terminal apparatus 60. For example, it is preferable that location information acquisition unit 77 acquire constantly acquire the location information repeatedly and attach the latest location information when the server communication unit 65 communicates with the meeting management server 30. In another example, the location information acquisition unit 77 acquires the location information in a particular situation such as when acquiring reservation information or when checking in.

The meeting application 60b further includes a storage unit 79 implemented by, for example, the ROM 702, the RAM 703, and/or the EEPROM 704. The user ID 791 is stored in the storage unit 79. The user ID 791 is stored when the authentication by the authentication request unit 71 is successful. The user ID 791 is, for example, a user account on the reservation management server 20.

Meeting Room Terminal:

The meeting room terminal 90 includes a server communication unit 91, a terminal apparatus communication unit 92, an operation reception unit 93, a display control unit 94, an electronic device communication unit 95, a terminal authentication unit 96, an imaging unit 97, a decoding unit 98, a settings recording unit 98-2, and a reservation information request unit 98-3. These functional units of the meeting room terminal 90 are functions or means that are implemented by operating one or more hardware elements illustrated in FIG. 5 in cooperation with instructions of the CPU 701 according to the program loaded from the EEPROM 704 to the RAM 703. The program is distributed from a server for program distribution or distributed as stored in a storage medium.

The server communication unit 91 communicates with the meeting management server 30 with a server URL 993 as a destination. Since the meeting room terminal 90 resides on the intra-company network N1, accessing from the meeting management server 30 to the meeting room terminal 90 is difficult. For this reason, the server communication unit 91 polls the meeting management server 30 to periodically communicate with the meeting management server 30. In addition to or in alternative to the polling, the server communication unit 91 communicates with the meeting management server 30 using a communication technology such as WebSocket. When the state of the meeting room terminal is "connected" and there is no communication from the server communication unit 91, "disconnected" is registered in the meeting room setting information DB 498. In a case in which the state of the meeting room terminal is "before setup", the state of the meeting room terminal remains as "before setup" regardless of presence or absence of communication. The server communication unit 91 performs communication using a communication protocol such as Hypertext Transfer Protocol (HTTP). Any other suitable communication protocol other than HTTP can be used.

The server communication unit 91 according to the present embodiment receives the reservation information and transmits, to the meeting management server 30, the meeting identification information, which is received by the terminal apparatus communication unit 92 from the terminal apparatus 60 or is manually input at the time of check-in. Further, the server communication unit 91 receives the control information from the meeting management server 30.

The terminal apparatus communication unit 92 communicates with the terminal apparatus 60. In the present embodiment, the terminal apparatus communication unit 92 receives the meeting identification information, etc. The electronic device communication unit 95 communicates with the electronic device 70. In the present embodiment, the electronic device communication unit 95 transmits, to the electronic device 70, the control information received by the server communication unit 91.

The display control unit 94 displays a screen generated by the terminal application 90*a* on the display 718. The screen displayed by the display control unit 94 is a standby screen that receives a check-in and a check-out. The operation reception unit 93 receives various operations input to the meeting room terminal 90.

The terminal authentication unit 96 authenticates the administrator's login to the terminal application based on whether the entered administrator password is correct or not. The authentication is required because the meeting room terminal 90 provided in the meeting room may be operated by an unspecified participant, so that the initial settings may be changed if there is no authentication function.

The imaging unit 97 mainly captures the image code. When the administrator operates the meeting room terminal 90 so that the image code is captured in an angle of view of the CMOS sensor 713, the imaging unit 97 recognizes the image code (image code for initial settings) and automatically generates image data. The decoding unit 98 decodes the image code captured by the imaging unit 97 and restores the communication setting information. The settings recording unit 98-2 stores the communication setting information (meeting room ID, authentication key, server URL, meeting room name) decoded by the decoding unit 98 in a storage unit 99. Each of the imaging unit 97, the decoding unit 98, and the settings recording unit 98-2 is a required process at the time of initial setting of the meeting room terminal 90 and is not used in the present embodiment.

The reservation information request unit 98-3 repeatedly transmits the meeting room ID and the authentication key to the meeting management server 30 via the server communication unit 91 at a periodic time interval for acquiring the reservation information. As a response to the transmission of the meeting room ID and the authentication key, the reservation information request unit 98-3 acquires the reservation information through the server communication unit 91. It is sufficient that the reservation information be acquired when any change is made in the reservation information. Examples of the periodical timings when the reservation information request unit 98-3 acquires the reservation information include from every several seconds to every several minutes. The shorter the periodical timings, the sooner the reservation information updated. However, The shorter the periodical timings, the greater the communication load. Accordingly, the periodical timings are determined in view of both the update frequency of the reservation information and the communication load. In the present embodiment, the reservation information request unit 98-3 acquires the reservation information every thirty seconds, for example. Further, the reservation information request unit 98-3 receives at least the meeting management information (reservation information) of the meeting room 6 of the current day via the server communication unit 91.

The meeting room terminal 90 further includes the storage unit 99. The storage unit 99 is implemented by, for example, the ROM 702 and/or the EEPROM 704 illustrated in FIG. 5. The storage unit 99 stores a meeting room ID 991, an authentication key 992, the server URL 993, a meeting room name 994, a terminal ID 995, an administrator password 996, and an IP address 997 of the electronic device 70.

The terminal ID 995 is identification information identifying the meeting room terminal 90. The terminal ID is used by the meeting management server 30 to identify the meeting room terminal 90 in order to prevent more than a preset number of meeting room terminals 90 from being connected to the meeting management server 30 in one meeting room. Examples of the terminal ID include a universally unique identifier (UUID) of the terminal application and a media access control (MAC) address. Any other suitable information can be used as the terminal ID, provided that the information is unique. The UUID is a unique identifier in a sense that two or more items do not have the same value all over the world without specific management.

The administrator password 996 is set by the administrator when the terminal application 90*a* is installed or when the terminal application 90*a* is activated for the first time. The IP address 997 of the electronic device 70 is set by the administrator as needed.

Figure 8:
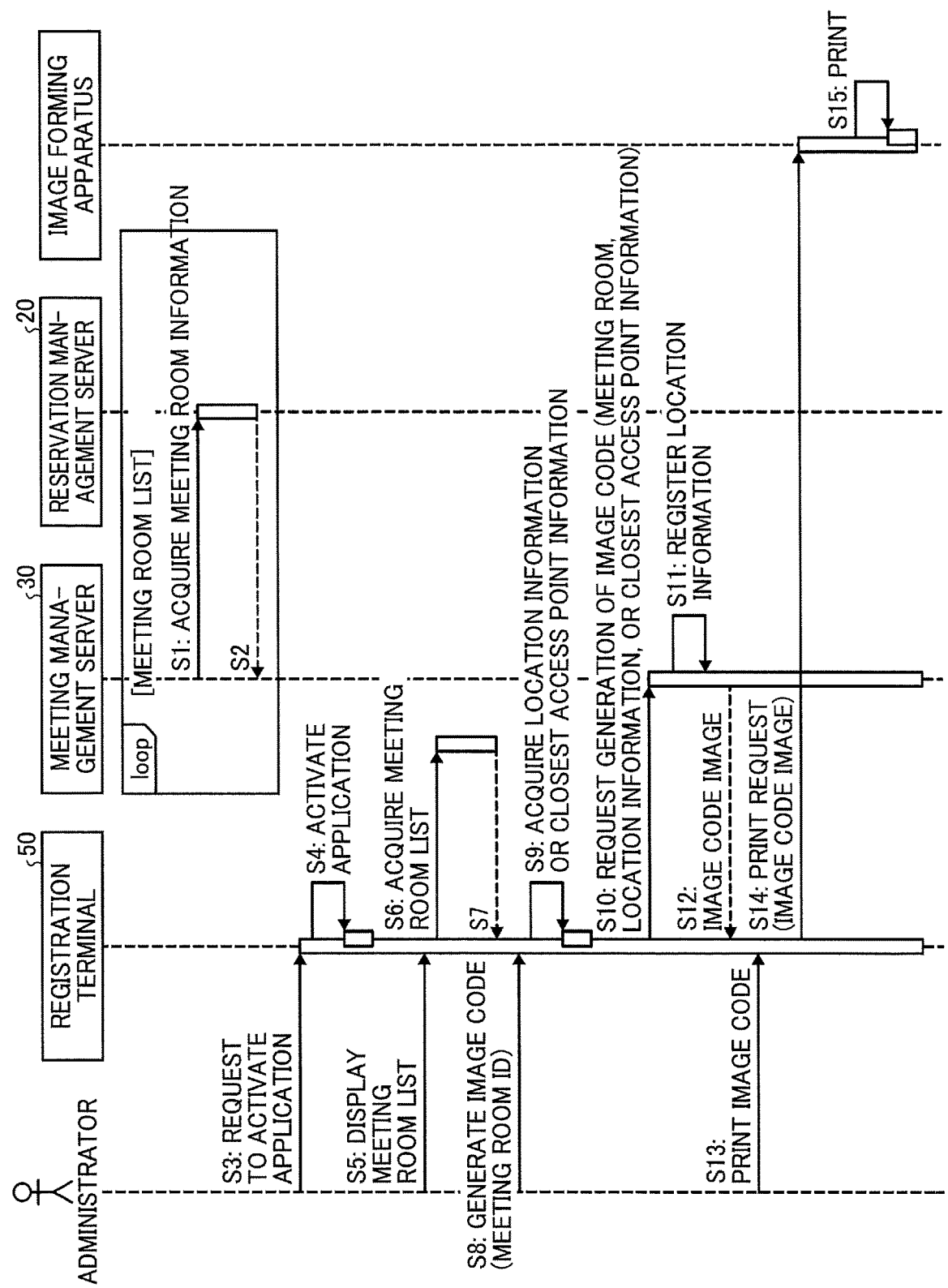
FIG. 8 is a sequence diagram illustrating an example of operation in which the registration terminal communicates with the meeting management server, to cause an image code to be printed, according to an embodiment of the present disclosure.

Printing of Image Code:

A description is given an operation of printing an image code in response to an administrator's request, with reference to FIG. 8. FIG. 8 is a sequence diagram illustrating an example of an operation in which the registration terminal 50 communicates with the meeting management server 30, to cause an image code to be printed.

S1, S2: The reservation information acquisition unit 33 of the meeting management server 30 transmits a resource list request to the reservation management server 20 at predetermined intervals. The resource list request indicates requesting a list of a customer's resources registered in the reservation management server 20. Since the meeting room is treated as a resource in the resource reservation system 100, the meeting management server 30 can acquire a list of the customer's meeting rooms by the resource list request. Examples of the predetermined intervals include, but not limited to, once a day, which is a relatively long interval. The resources include the meeting room as well as the electronic device 70.

S3: The administrator inputs an operation to activate an application to the registration terminal 50. For example, this application is an application dedicated to an administrator. In another example, the meeting application 60*b* is used as this application. In still another example, a web browser is used as this application.

S4: In response to the operation by the administrator, the application starts up.

S5: The administrator inputs, to the registration terminal 50, an instruction to display a list of meeting rooms registered in the meeting management server 30. The operation reception unit 52 receives this administrator's operation.

S6: The communication unit 51 of the registration terminal 50 sends a request for the list of meeting rooms to the meeting management server 30.

S7: The reception unit 31*b* of the meeting management server 30 receives the request for the list of the meeting rooms and transmits the list of meeting rooms registered in the meeting room setting information DB 498 to the registration terminal 50. For example, the reception unit 31*b* transmits the meeting room names and the meeting room IDs. However, the reception unit 31*b* can transmit any information registered in the meeting room setting information DB 498 in response to the request for the list of meeting rooms.

S8: The administrator selects a particular meeting room where the administrator is currently present and inputs an operation for generating an image code. The operation reception unit 52 receives this administrator's operation.

S9: When the operation for generating the image code is input, the location information acquisition unit 54 of the registration terminal 50 automatically acquires location information. The location information is preferably detected by the GNSS. In a case in which the GNSS is not available because, for example, as the location is indoor, the indoor messaging system (IMES) can be used. In a case where neither GNSS nor the IMES is available, a MAC address of an access point (Wi-Fi) that is closest to the registration terminal 50 or is connected to the registration terminal 50 can be used.

S10: The communication unit 51 of the registration terminal 50 designates the meeting room ID and the location information and sends a request for generating an image code to the meeting management server 30.

S11: The reception unit 31*b* of the meeting management server 30 receives the request for generating an image code. The image code creation unit 46 acquires the meeting room ID, the authentication key, and the email address of the meeting room, which are identified by the meeting room ID, from the meeting room setting information DB 498, and generates an image code. Further, the image code creation unit 46 registers the location information transmitted from the registration terminal 50 in the meeting room setting information DB 498 in association with the meeting room identified by the meeting room ID.

S12: The transmission unit 31*a* of the meeting management server 30 transmits the generated image code to the registration terminal 50.

S13: The communication unit 51 of the registration terminal 50 receives the image code, and the display control unit 53 controls the display 206 to display the received image code. The administrator inputs an operation for printing the image code to the registration terminal 50. The operation reception unit 52 receives this administrator's operation.

S14: The communication unit 51 of the registration terminal 50 transmits a request for printing the image code to an image forming apparatus (printer).

S15: The image forming apparatus prints the image code.

Thus, in the operation of printing the image code to be presented in the meeting room where the administrator is currently present, the administrator can register the location information of the meeting room in the meeting management server 30.

Figure 9:
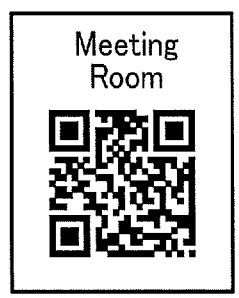
FIG. 9 is a diagram illustrating an example of the image code printed by an image forming apparatus, according to an embodiment of the present disclosure.

FIG. 9 illustrates an example of the image code printed by the image forming apparatus. This image code is presented in the meeting room or at the entrance of the meeting room. A user captures the image code with the terminal apparatus 60 to display the reservation information on the terminal device or check in the meeting room.

Figure 10A:
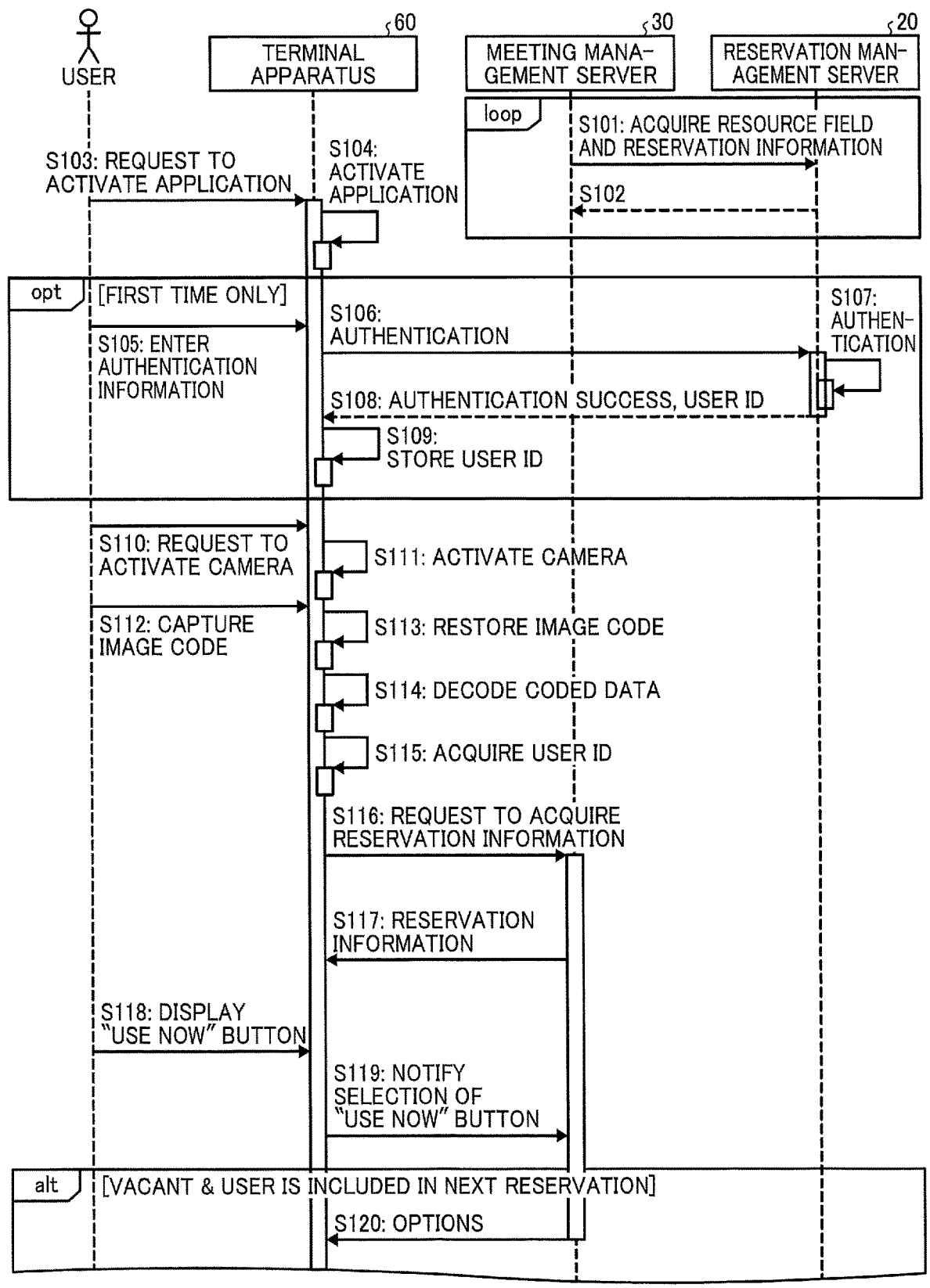
FIG. 10A is a sequence diagram illustrating operation performed by the resource reservation system, according to an embodiment of the present disclosure.
Figure 10B:
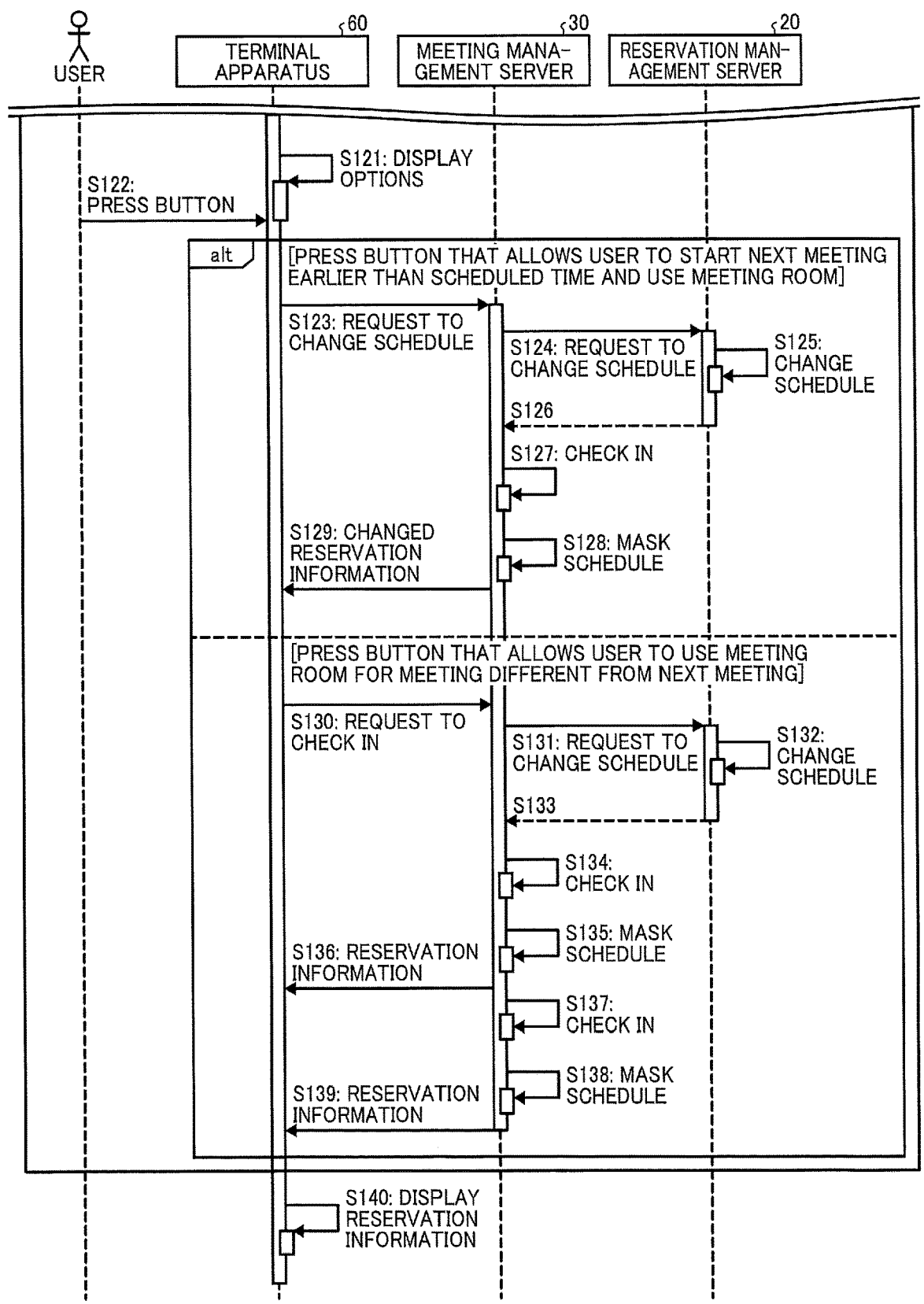
FIG. 10B is a sequence diagram illustrating operation performed by the resource reservation system, according to an embodiment of the present disclosure.

Operation Performed in Case in which Terminal Apparatus Displays Reservation Information and Use Now Button is Pressed:

A description is now given of an operation from displaying the reservation information by the terminal apparatus 60 to the check-in by a user, with reference to FIGS. 10A and 10B (FIG. 10). FIG. 10A and FIG. 10B (FIG. 10) are sequence diagrams illustrating an operation performed by the resource reservation system 100.

S101, S102: The reservation information acquisition unit 33 of the meeting management server 30 repeatedly transmits a reservation information acquisition request to the reservation management server 20. The reservation information acquisition request indicates designating a domain and requesting the reservation information of the reservation-making user who has this domain in the account. Thereby, the meeting management server 30 acquires reservation information for a fixed time period. It is preferable that the intervals at which the reservation information acquisition request is transmitted is relatively short, e.g., every few minutes, every 30 minutes, or every hour. Further, every time new reservation information is registered or any reservation information is changed, the newly registered or changed reservation information may be automatically transmitted from the reservation management server 20.

S103: On the other hand, a user who wants to check in to the meeting room (reservation-making user, participant, or neither) inputs an instruction for activating the meeting application 60*b* to the terminal apparatus 60.

S104: In response to the instruction, the meeting application 60*b* is activated. The URLs of the meeting management server 30 and the reservation management server 20 are preset in the meeting application 60*b*. In a case in which the meeting application 60*b* is substituted by the browser software, the user may set the URL.

S105: The user inputs the authentication information of the reservation management server 20 to the terminal apparatus 60. Since the meeting management server 30 identifies the user by using the user's account on the reservation management server 20, the user's account is substantially the same as the authentication information of the meeting management server 30. The user enters a password and a user ID. The operation reception unit 69 of the terminal apparatus 60 receives the authentication information. After being entered once, the authentication information is not required to be entered again. This is because the terminal apparatus 60 is dedicated to the user and the user ID 791 is stored in the storage unit 79 when the authentication is successful.

S106: The authentication request unit 71 of the terminal apparatus 60 transmits the authentication information to the reservation management server 20 via the server communication unit 65.

S107: The communication unit 21 of the reservation management server 20 receives the authentication information, and the authentication unit 23 refers to the authentication information DB 292 to authenticate the user. The following description of the present embodiment is given on the assumption that the authentication is successful.

S108: The communication unit 21 of the reservation management server 20 transmits information indicating that the authentication is successful and the user ID to the terminal apparatus 60. In another example, an authentication ticket such as OAUTH (information identifying a person who logged in and what kind of processing authorization the person has) may be sent.

S109: The server communication unit 65 of the terminal apparatus 60 receives the information that the authentication is successful and the user ID and stores the user ID 791 in the storage unit 79.

S110: The user performs an operation for activating a camera (CMOS sensor 713) on the terminal apparatus 60.

S111: In response to the operation by the user, the camera starts up. In another example, the camera automatically starts up in response to the activation of the meeting application 60*b*.

S112: The user performs an operation of capturing an image code presented in the meeting room. The acquisition unit 72 captures the image code. The image code is printed in advance from the printer using, for example, the meeting room setting information stored in the meeting management server 30. In one example, the image code is affixed near the door of the meeting room or placed on a desk in the meeting room. In another example, the image code is displayed on a display. For example, the electronic device 70 (electronic whiteboard, projector) can display the image code. In still another example, the image code is displayed on electronic paper. In these cases, printing of the image code can be omitted.

S113, S114: The decoding unit 73 acquires the image code and restores the meeting room information. In other words, the decoding unit 73 generates the meeting room ID, the authentication key, and the email address of the meeting room. In a case in which the meeting room information is encrypted, the decoding unit 73 decrypts the meeting room information. By encrypting the meeting room information, the terminal apparatus 60 in which the meeting application 60b is not operating can be prevented from connecting to the meeting management server 30 even when the image code is acquired. The image code may include, for example, the IP address of the meeting management server 30.

S115: In order to connect to the meeting management server 30, the reservation information request unit 74 further acquires the user ID 791 from the storage unit 79.

S116: The reservation information request unit 74 designates the meeting room ID, the authentication key, the email address of the meeting room, and the user ID and sends a request for the reservation information of the meeting room in which the image code is presented to the meeting management server 30 via the server communication unit 65.

S117: The reception unit 31b of the meeting management server 30 receives the request for the reservation information. First, the authentication key verification unit 41 determines whether the authentication key that is identified by the meeting room ID and is stored in the meeting room setting information DB 498 matches the transmitted authentication key. In the following, a description is given on the assumption that the authentication keys match. In another example, authentication by email address is further performed. The transmission unit 31a of the meeting management server 30 transmits the reservation information to the terminal apparatus 60. Further, in another example, the terminal apparatus 60 transmits the location information, and the meeting management server 30 transmits the reservation information when the distance between the location of the terminal apparatus 60 and the location of the meeting room registered in the meeting room setting information DB 498 is less than a threshold value. This prevents a user who is not near the meeting room from checking in the meeting room.

Figure 11A:
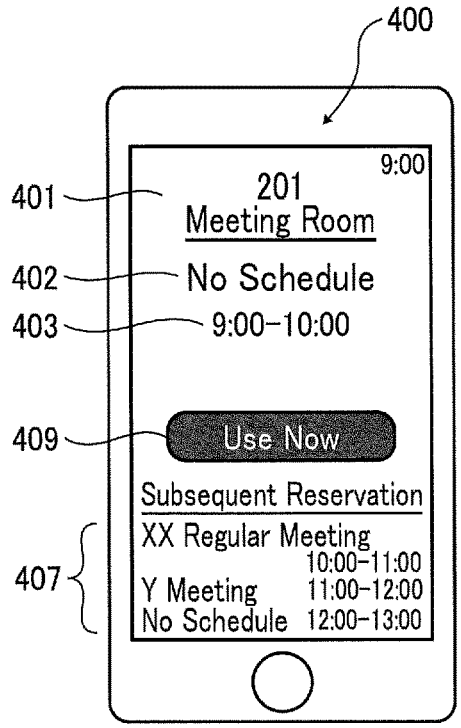
FIG. 11A is a diagram illustrating an example of a reservation information screen displayed in the operation described with reference to the sequence diagrams of FIG. 10A and FIG. 10B.

S118: The server communication unit 65 of the terminal apparatus 60 receives the reservation information. In a case in which there is no reservation for the current time (and not in the state of waiting for check-in), the display control unit 66 displays the "use now" button. FIG. 11A illustrates an example of a screen displayed on the terminal apparatus 60. Since the user wants to use the meeting room immediately, the user presses the "use now" button. The operation reception unit 69 receives pressing of the button.

S119: The server communication unit 65 of the terminal apparatus 60 transmits, to the meeting management server 30, information indicating that the "use now" button is pressed. The information indicating that the "use now" button is pressed includes a check-in request and the meeting room ID.

S120: The reception unit 31b of the meeting management server 30 receives the information indicating that the "use now" button is pressed. The usage management unit 38 determines whether there is a reservation for the current time. In other words, the usage management unit determines whether the status of the meeting room indicated by the reservation information is not "waiting for check-in", while the "use now" button is pressed. In the following, a description is given of an example case where there is no reservation for the current time. In this case, the usage management unit 38 further determines whether a user identified by the user ID transmitted from the terminal apparatus 60 is included in the reservation-making user or participant of the earliest reservation information after the current time (the time when the "use now" button is pressed) of the meeting room identified by the meeting room ID. When the determination result indicates that the user ID is included in the earliest reservation information after the current time, the usage management unit 38 sends, to the terminal apparatus 60 via the transmission unit 31a, a request for display two options, one being a button that allows the user to start the next meeting earlier than the scheduled time and use the meeting room, and the other being a button that allows the user to use the meeting room for a meeting different from the next meeting. The button that allows the user to start the next meeting earlier than the scheduled time and use the meeting room is hereinafter referred to as "Button A". Button A is an example of a first button. The button that allows the user to use the meeting room for a meeting different from the next meeting is hereinafter referred to as "Button B". Button B is an example of a second button.

Figure 11B:
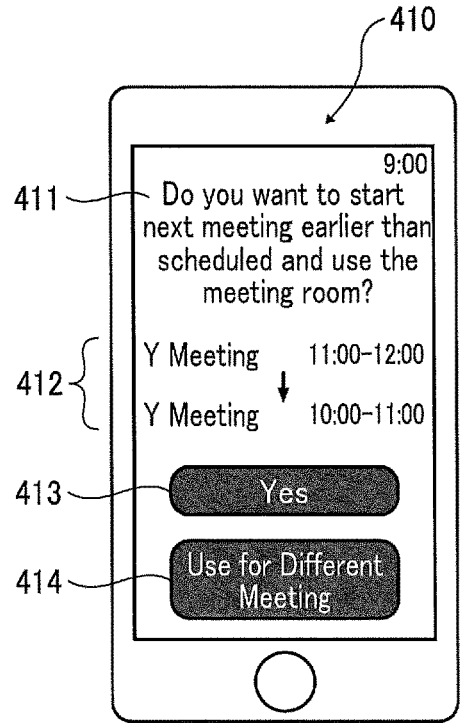
FIG. 11B is a diagram illustrating an example of an entry screen displayed in the operation described with reference to the sequence diagrams of FIG. 10A and FIG. 10B.

S121: The server communication unit 65 of the terminal apparatus 60 receives the request for displaying the two buttons, i.e., Button A and Button B as the options, and the display control unit 66 displays Button A and Button B. FIG. 11B illustrates an example of a screen displayed on the terminal apparatus 60 in step S121.

S122: The user presses Button A or Button B displayed on the terminal apparatus 60. The operation reception unit 69 receives pressing of Button A or Button B.

When the user presses Button A, processes of steps S123 to S129 are performed.

S123: The reservation request unit 76 of the terminal apparatus 60 transmits a reservation change request to the meeting management server 30 via the server communication unit 65.

S124: The reception unit 31b of the meeting management server 30 receives the reservation change request. The reservation unit 45 transmits, to the reservation management server 20, the reservation change request requesting to advance the start time of the reservation information determined that the same user is included to the current time (the time when the reservation change request is received from the user). This reservation information is designated by, for example, the reservation ID.

Since the user's account information is required to change the reservation information, it is preferable that the storage unit 79 of the terminal apparatus 60 stores an authentication ticket obtained through the user authentication, and the terminal apparatus 60 attaches the authentication ticket to the reservation change request.

S125: The communication unit 21 of the reservation management server 20 receives the reservation change request, and the reservation information management unit 22 changes the reservation information identified by the reservation ID. In other words, the reservation information management unit 22 advances the start time to the current time.

S126: Since the reservation information has been changed, the communication unit 21 transmits a notification indicating the change of reservation information to the meeting management server 30. Accordingly, the reservation information acquisition unit 33 of the meeting management server 30 requests the reservation information for the reservation management server 20, to acquire the changed reservation information.

S127: The reservation information is stored in the meeting management information DB 493. Since the current time is included within a time period a certain time before the start time of the reservation, the usage management unit 38 permits check-in. In this case, the authentication that the user is a person has reserved the meeting is completed by the user ID. Therefore, the usage management unit 38 permits the check-in and changes the status to the "checked-in".

S128: The reservation information transmission unit 44 masks the reservation information. A detailed description is given below of this mask processing.

Figure 11C:
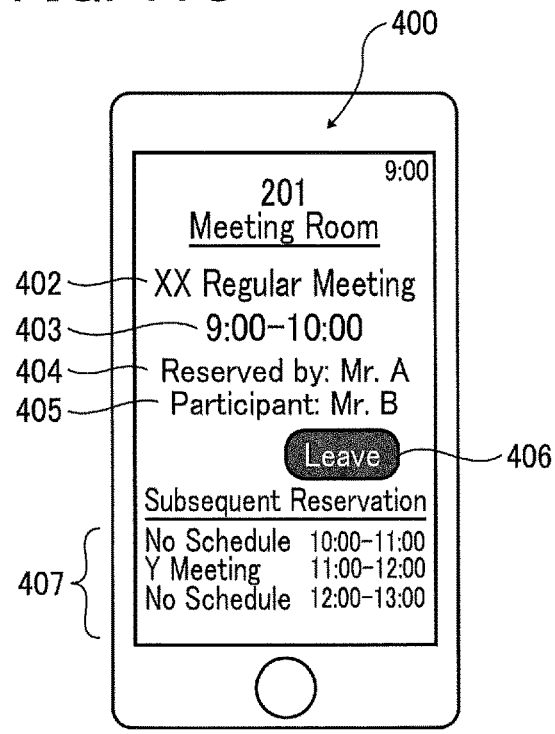
FIGS. 11C and 11D are diagrams each illustrating an example of the reservation information screen displayed in the operation described with reference to the sequence diagrams of FIG. 10A and FIG. 10B.

S129: The transmission unit 31*a* transmits, to the terminal apparatus 60, the reservation information whose status is changed to the checked-in and whose start time is changed. The server communication unit 65 of the terminal apparatus 60 receives the reservation information, and the display control unit 66 displays the reservation information. FIG. 11C illustrates an example of a screen displayed on the terminal apparatus 60.

When the user presses Button B, processes of steps S130 to S139 are performed.

S30: When the user presses Button B, the server communication unit 65 of the terminal apparatus 60 transmits a new reservation request to the meeting management server 30. The new reservation request includes a check-in request and the meeting room ID.

S131: The reception unit 31*b* of the meeting management server 30 receives the new reservation request and the check-in request. The reservation unit 45 transmits the new reservation request to the reservation management server 20, while designating the meeting room ID and a time slot. The start time of the reservation is the current time (i.e., the time when the new reservation request and check-in request is received from the user). The end time of the reservation is the start time of the reservation information that is determined as including the same user. Alternatively, the time zone can be from the current time to a certain time period after the current time. The time zone can be set to any suitable time period between the current time and the end time. In the reservation of the meeting room, the end time of a certain reservation cannot be set to the same time as the start time of the subsequent reservation, the end time can be set to any time before the start time. Alternatively, a reservation for a predetermined time period is requested.

For the new reservation, either the account of the meeting management server 30 or the user's account is used. A case in which the user's account is used is the same as the case in which Button A is pressed. The account (authentication ticket) of the meeting management server 30 is held by the meeting management server 30.

S132: The communication unit 21 of the reservation management server 20 receives the new reservation request, and the reservation information management unit 22 newly creates reservation information of the meeting room.

S126: Since the new reservation information is registered, the communication unit 21 transmits a notification indicating the change of reservation information to the meeting management server 30. Accordingly, the reservation information acquisition unit 33 of the meeting management server 30 requests the reservation information for the reservation management server 20, to acquire the changed reservation information.

S134: The reservation information is stored in the meeting management information DB 493. Since the current time is included within a time period a certain time before the start time of the new reservation, the usage management unit 38 permits check-in. The usage management unit 38 permits the check-in and changes the status to the "checked-in".

S135: The reservation information transmission unit 44 masks the reservation information. A detailed description is given below of this mask processing.

Figure 11D:
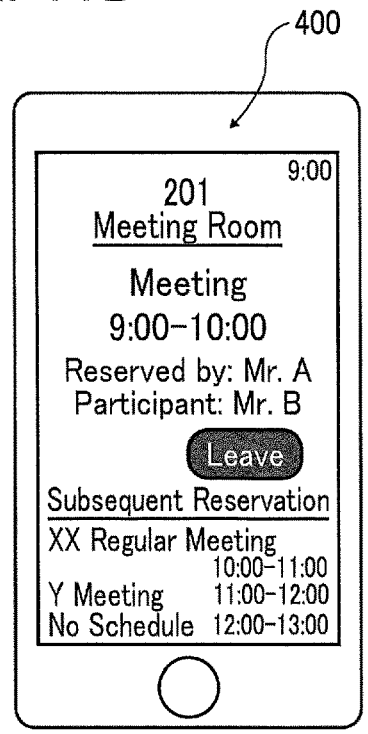

S136: Further, the transmission unit 31*a* transmits, to the terminal apparatus 60, the new reservation information whose status is changed to the checked-in. The server communication unit 65 of the terminal apparatus 60 receives the reservation information, and the display control unit 66 displays the reservation information. FIG. 11D illustrates an example of a screen displayed on the terminal apparatus 60.

S137: Thereafter, when the status of the original reservation information, which was made before the new reservation, transitions to the "waiting for check-in", the usage management unit 38 performs the check-in process on the original reservation information. In other words, the usage management unit 38 automatically performs the check-in process again, to change the status to the "checked-in".

S138: The reservation information transmission unit 44 masks the reservation information. A detailed description is given below of this mask processing.

S139: Further, the transmission unit 31*a* transmits, to the terminal apparatus 60, the reservation information whose status is changed to the checked-in. The reservation information transmission unit 44 masks the reservation information. A detailed description is given below of this mask processing.

S140: The display control unit 66 of the terminal apparatus 60 controls the display to display the reservation information.

Thus, in both of the case in which the user presses Button A and the case in which the user presses Button B, the meeting management server 30 prevents the user from forgetting to perform the check-in operation. That is, when the user presses Button A, the meeting management server 30 advances the start time of the meeting and allows the user to start using the meeting room (an example of a predetermined timing). When the user presses Button B, the meeting management server 30 automatically permits the user to use the meeting room when the check-in to the meeting room is available (an example of a predetermined timing).

Note that, in a case in which the user presses Button A, it is determined in advance whether the end time of the original meeting is set earlier by a time period equal to a time period by which the end time of the original meeting is advanced or the end time is not changed. Alternatively, the user can set the end time after pressing Button A.

Mask Processing:

A description is now given of the mask processing. The reservation information transmission unit 44 masks information relating to a user or users other than the current user with respect to the reservation information of the meeting room identified by the meeting room ID. The twit "mask" refers to processing information into an unreadable state. For the reservation information in which the reservation-making user account or the expected participant account does not include the user ID transmitted from the terminal apparatus 60, the reservation information transmission unit 44:

replaces the meeting name with a general term such as "meeting"; and delete the name of the reservation-making user or the name of the expected participant.

This prevents an unspecified number of people from viewing the reservation information (the meeting name, reservation-making user name, participant name) of the meeting room.

Reservation Information Screen:

A description is now given of a reservation information screen 400 displayed by the terminal apparatus 60 with reference to FIGS. 11A to 11D and FIGS. 12A to 12C. FIGS. 11A, 11C and 11D each illustrates an example of the reservation information screen 400, and FIG. 11B illustrates an example of an entry screen 410, each screen displayed in the operation described above with reference to the sequence diagrams of FIG. 10A and FIG. 10B. FIGS. 12A to 12C are each the reservation information (reservation information held in the meeting management information DB 493) used for describing the reservation information screen 400.

FIG. 11A illustrates an example of the reservation information screen 400 displayed when the user captures the image code by the terminal apparatus 60. The reservation information screen 400 includes a meeting room name 401, a meeting name field 402, a meeting time 403, a "use now" button 409, and a subsequent reservation field 407.

In the meeting room name 401, the meeting room name is displayed. The meeting room name is transmitted from the meeting management server 30 or is included in the image code.

The meeting name in the meeting name field 402 is included in the reservation information.

The meeting time 403 is included in the reservation information.

The "use now" button 409 is displayed by the display control unit 66 when the status of the next meeting is in a state other than the waiting for check-in.

Subsequent reservations in the subsequent reservation field 407 are included in the reservation information.

The reservation information screen 400 illustrated in FIG. 11 is displayed when Mr. A captured an image code at 9:00. In addition, the meeting room is reserved in units of hours. According to FIG. 12A, since there is no reservation from 9:00 to 10:00, "No schedule" is displayed in the meeting name field 402. Further, a meeting time (9:00-10:00) of a meeting including the current time is displayed in the meeting time 403. Furthermore, since there is no schedule, the "use now" button 409 is displayed.

In the subsequent reservation field 407, the meeting name may be masked. According to FIG. 12A, since Mr. A is the reservation-making user of the "XX regular meeting", the reservation information transmission unit 44 transmits the meeting name in the subsequent reservation field 407 without masking the meeting name. Since Mr. A is the reservation-making user of the "Y meeting", the reservation information transmission unit 44 transmits the meeting name in the subsequent reservation field 407 without masking the meeting name. Note that the mask processing may be performed by the terminal apparatus 60.

Since Mr. A is the reservation-making user of the "XX regular meeting, Mr. A wants to use the meeting room earlier than scheduled. Therefore, Mr. A presses the "use now" button 409.

The usage management unit 38 of the meeting management server 30 receives the pressing of the "use now" button 409. In the present embodiment, in a case in which the user who causes the reservation information of FIG. 11A to be displayed (i.e., the user who presses the "use now" button 409) is the reservation-making user or participant of the meeting room reserved subsequent to the current time, the usage management unit 38 causes the terminal apparatus 60 to display an entry screen 410 indicating that the usage of the meeting room is available earlier than scheduled.

FIG. 11B illustrates an example of the entry screen 410. The entry screen 410 includes a message 411 "Do you want start next meeting earlier than scheduled and use the meeting room?", next reservation information 412 that includes the reservation-making user or the participant who is the same as the user who causes the reservation information of FIG. 11A to be displayed, an "Yes" button 413, and a "Use for different meeting" button 414. The "Yes" button 413 corresponds to the button that allows the user to start the next meeting earlier than the scheduled time and use the meeting room. In other words, the "Yes" button 413 corresponds to Button A. The "Use for different meeting button" 414 corresponds the as a separate meeting corresponds to the button that allows the user to use the meeting room for a meeting different from the next meeting. In other words, the "Use for different meeting" button 414 corresponds to "Button B".

In the next reservation information 412 of FIG. 11B, the next reservation information that includes the reservation-making user or the participant who is the same as the user who causes the reservation information of FIG. 11A to be displayed is displayed. Further, in the next reservation information 412, a time before change and a time after change are displayed. Since the time after change is the current time, the time after change is transmitted from the meeting management server 30 or displayed by the terminal apparatus 60.

FIG. 11C illustrates an example of the reservation information screen 400 displayed by the terminal apparatus 60 in response to pressing of the "Yes" button 413. In response to pressing of the "Yes" button 413, the start time of the next reservation information is advanced as described above. Since the "XX regular meeting" indicated in FIG. 12A is advanced, the reservation information changes as illustrated in FIG. 12B. Therefore, the subsequent reservation field 407 indicates that there is no schedule from 10:00 to 11:00. Since the "XX regular meeting" is advanced, "XX regular meeting" is displayed in the meeting name field 402 in FIG. 11C.

The meeting time indicated by the meeting time 403 does not change from 9:00 to 10:00. This is because the end time of the next meeting information is advanced by the same time period as the time period by which the start time of the next reservation information is advanced. In another example, the end time does not always have to be advanced, as described above.

Further, the reservation information screen 400 of FIG. 11C includes a reservation-making user name 404, a participant name 405, and a "leave" button 406. The reservation-making user name 404 and the participant name 405 are subject to the mask processing. However, in the present example, since the reservation-making user of the "XX regular meeting" is Mr. A, who is the same as the user who causes the reservation information of FIG. 11A to be displayed, the reservation-making user name and the participant name are not masked.

Further, in a case in which the user who causes the reservation information of FIG. 11A to be displayed (i.e., the user who presses the "use now" button 409) is the reservation-making user or participant of the meeting room reserved subsequent to the current time, the check-in processing is automatically performed. Thus, the reservation information transmission unit 44 transmits the reservation information whose status is the checked-in to the terminal apparatus 60. Accordingly, the display control unit 66 of the terminal apparatus 60 displays the leave button 406. The "leave" button 406 is a button that allows the user to check-out.

The meeting name in the subsequent reservation field 407 can be subject to the mask processing. However, in the present example, the meeting name is not masked in substantially the same manner as in FIG. 11A.

FIG. 11D is an example of the reservation information screen 400 displayed by the terminal apparatus 60 In response to pressing of the "Use for different meeting" button 414. When the "Use for different meeting" button 414 is pressed as a separate meeting, a new reservation for the meeting room is made, as described above.

Since the new reservation for the meeting room is made, the reservation information changes as illustrated in FIG. 12C. The reservation unit 45 of the meeting management server 30 automatically assigns a meeting name such as "Meeting". In addition, there is no change in the other reservations including the "XX regular meeting" and the subsequent reservations.

Therefore, "Meeting" is displayed in the meeting name field 402. In addition, the start time and end time of the newly reserved meeting are displayed in the meeting time 403. The reservation-making user name 404, the participant name 405, and the "leave" button 406 are displayed in substantially the same manner as illustrated in FIG. 11C.

In the example of FIG. 12C, the reservation-making user of "XX regular meeting" is Mr. A, who is the same as the reservation-making user of "Y meeting", and the end time of "XX regular meeting" matches the start time of "Y meeting". Accordingly, the usage management unit 38 automatically performs check-in when the status of the reservation information of "Y meeting" transitions to the waiting for check-in. This prevents the user from forgetting to perform the check-in operation even when the user participates in different meetings successively.

Figure 13:
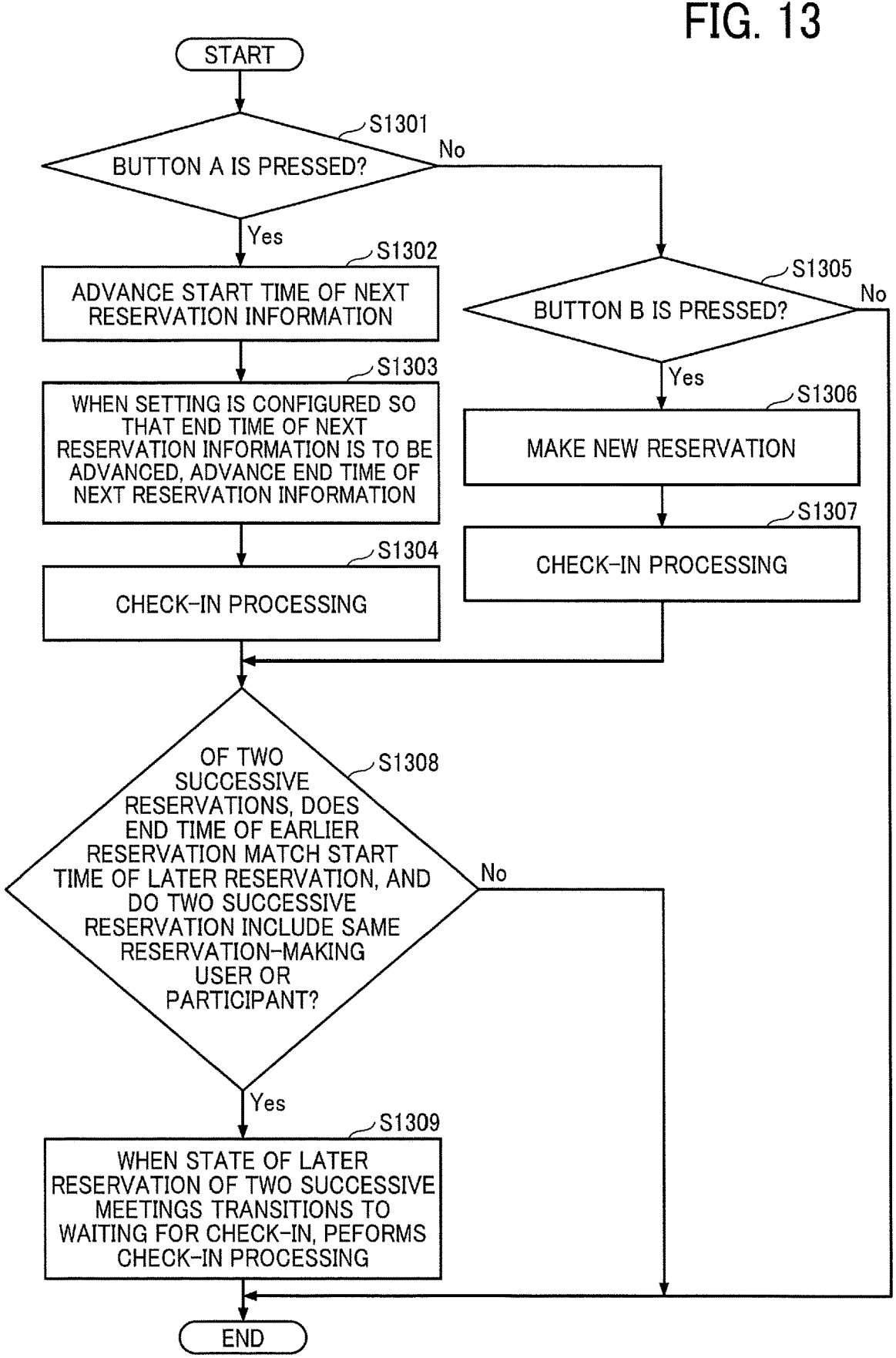
FIG. 13 is a flowchart illustrating an example of operation by the meeting management server, according to an embodiment of the present disclosure.

Processes by Meeting Management Server:

FIG. 13 is a flowchart illustrating an example of an operation performed by the meeting management server 30. Note that the mask processing of the reservation information is omitted in FIG. 13. The operation illustrated in FIG. 13 is performed after the meeting management server controls the terminal apparatus 60 to display the entry screen 410.

The usage management unit 38 determines whether Button A is pressed (S1301). When the button A is pressed (S1301: Yes), the reservation unit 45 advances the start time of the reservation information that is next to the current time and that includes the reservation-making user or the participant who is the same as the user who causes the reservation information to be displayed (S1302).

Further, the reservation unit 45 advances the end time of the next reservation information that includes the reservation-making user or the participant who is the same as the user who causes the reservation information to be displayed (S1303). This process of step S1303 is performed in a case the setting is configured so that the end time is also to be advanced. The end time does not always have to be advanced.

The reservation unit 45 performs the check-in processing on the reservation information whose start time has been advanced (S1304). The check-in processing is automatically performed according to the relationship between the current time and the start time of the reservation.

In a case in which Button A is not pressed (S1301: No), the usage management unit 38 determines whether Button B is pressed (S1305). When the button B is pressed (S1305: Yes), the reservation unit 45 makes a new reservation for the meeting room (S1306). In one example, the meeting time of the newly reserved meeting is a predetermined minimum unit. In another example, the meeting time is set so that the start time is the current time and the end time is the start time of the next meeting.

The reservation unit 45 performs check-in processing on the reservation information that is newly made (S1307). The check-in processing is automatically performed according to the relationship between the current time and the start time of the reservation.

Further, in both of the case in which the user presses Button A and the case in which the user presses Button B, the usage management unit 38 determines whether the start time of a certain reservation matches the end time of the next reservation, (in other words, whether of the two successive reservation information, the end time of the earlier reservation information matches and the start time of the later reservation information), and whether the two successive reservations include the same reservation-making user or participant (S1308). When the determination result in step S1308 is Yes, the usage management unit 38 performs check-in processing when the status of the later reservation of the two successive reservations transitions to the waiting for check-in (S1309). Note that, of the two successive reservations, the end time of the earlier reservation and the start time of the later reservation does not have to match exactly. When the difference between the end time of the earlier reservation and the start time of the later reservation is within a certain time period, it is regarded that the end time of the earlier reservation matches the start time of the later reservation. This is because the certain time period is ensured for users to enter or leave a meeting room, for example, and therefore the two meetings are regarded as the substantially successive meetings, provided that the time difference within the certain time period.

As described heretofore, when the user who causes the reservation information to be displayed is included in the next reservation information after the current time, the resource reservation system according to the present embodiment advances the next reservation or makes a new reservation for the meeting room. Further, when the new reservation is made, the check-in processing is automatically performed on the next reservation after the current time. Therefore, the resource reservation system according to the present embodiment prevents the user from forgetting to perform the check-in operation.

In some cases, the start of use of a reserved resource is denied even though the use should be permitted. For example, a meeting participant sometimes arrives at a meeting room earlier than a meeting start time. However, the resource reservation system does not accept the start of use until the current time reaches the meeting start time. In such situation, if the meeting room is vacant, the participant starts the meeting in the meeting room without requesting the system to accept the start of use. Thereafter, the current time reaches a time when the resource reservation system accepts the start of use. However, in some cases, the participant does not perform an operation to start using the meeting room, because the participant has already started the meeting. When the participant does not perform the operation to start using the meeting room, the resource reservation system automatically cancels the reservation. This allows a different user to reserve the meeting room for a time slot that overlaps a time slot of the canceled reservation. Even when the reservation is not automatically canceled, such use of the meeting room is recognized as the use that does not comply with rules, because the meeting room is being used without the operation to start using the meeting room.

According to an embodiment of the present disclosure, a resource reservation system is provided, which is configured to permit the start of use of a reserved resource.

Variations:

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

For example, although in the present embodiment, the description given above is of an example in which the terminal apparatus 60 reads (captures) the image code for the check-in, alternatively, the meeting room terminal 90 can be used for the check-in. In this case, the meeting room terminal 90 prompts the user to enter the meeting identification information after pressing the "use now" button, and the meeting management server 30 uses the entered meeting identification information to authenticate the next reservation information after the current time. When the authentication is successful, the user who entered the meeting identification information is regarded as the reservation-making user or participant of the next reservation information after the current time. Therefore, the resource reservation system can advance the reservation or make a new reservation in substantially the same manner.

There can be a plurality of meeting management servers 30, or the functions of the meeting management server 30 can be distributed to a plurality of servers. The reservation management server 20 and the meeting management server 30 can be implemented by a single entity.

The apparatuses or devices described in the present embodiment are merely one example of plural computing environments that implement one or more embodiments disclosed herein. In some embodiments, the meeting management server 30 includes multiple computing devices, such as a server cluster. The plural computing devices are configured to communicate with one another through any type of communication link including a network, shared memory, etc., and perform the processes described in this disclosure.

The resource reservation system 100 of the present embodiment can also be referred to as a "web service". The web service refers to various services provided by the internet-related technologies. Examples of the web service include various rental services including a meeting room rental service. A system that uses the service is called a usage system.

In addition, the functional configuration of the resource reservation system 100 are divided into the functional blocks as illustrated in FIGS. 6A and 6B (FIG. 6) and FIGS. 7A and 7B (FIG. 7), for example, based on main functions thereof, in order to facilitate understanding the processes performed by the resource reservation system 100. No limitation is intended by how the processes are divided or by the names of the processes. The resource reservation system 100 can also be divided into the larger number of units according to the processing contents. Further, one process can be divided to include the larger number of processes.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A resource reservation system comprising:
a terminal apparatus including a camera and first circuitry; and
an information processing apparatus including second circuitry that is communicably connected to the information processing apparatus, wherein
the first circuitry is configured to
capture an image code displayed at a location of a resource via the camera, the image code including resource identification information;
decode the captured image code to extract the resource identification information included in the captured image code;
acquire reservation information of the resource corresponding to the extracted resource identification information from the information processing apparatus;
transmit a use start request to the information processing apparatus, the use start request being a request to start using the resource corresponding to extracted resource identification information, and including user identification information of a user of the terminal apparatus,
the second circuitry is configured to:
determine whether the user identification information included in the use start request matches user identification information included in next reservation information corresponding to a reservation to use the resource identified by the next reservation information that is scheduled to start after a time when the use start request is received; and
send a display request to the terminal apparatus, in a case in which the user identification information included in the use start request matches the user identification information included in the next reservation information and the resource is not reserved for a current time, to request display of a reservation information screen including a reservation-time field and a first button, the first button being operable by the user to transmit the use start request for starting use of the resource earlier than a scheduled time in the next reservation information;
the first circuitry is further configured to display the reservation information screen and the first button, in response to receiving the display request, on a display of the terminal apparatus, and to transmit the use start request to the information processing apparatus in response to a user operation of the displayed first button; and
the second circuitry is further configured to
advance, in response receiving the use start request from the terminal apparatus, a start time of the reservation corresponding to the next reservation information, and advance an end time of the reservation of the next reservation information after the current time by a same time period as a time period by which the start time is advanced;

update the next reservation information to indicate the start of using the resource identified by the next reservation information in which the start time is advanced; and
send the updated next reservation information to the terminal apparatus, and
the first circuitry updates the reservation information screen to display the advanced start time and the advanced end time of the reservation in the reservation-time field.

2. The resource reservation system of claim 1, wherein the resource is a meeting room,
the second circuitry is further configured to:
send a display request to request display of the first button and a second button to the terminal apparatus
the first button allowing the user to start a next meeting earlier than the scheduled time in the next reservation information and use the meeting room, and
the second button allowing the user to use the meeting room for a meeting different from the next meeting,
the first circuitry is further configured to:
display the first button and the second button on the display of the terminal apparatus in response to receiving the display request; and
the second circuitry is further configured to:
advance the start time of the next meeting in response to receiving the user operation of the displayed first button, and
make a new reservation for the meeting room for a time period between the current time and the start time of the next meeting in response to receiving a user operation of the displayed second button.

3. The resource reservation system of claim 2, wherein the first circuitry is further configured to:
acquire identification information of the meeting room, the identification information identifying a particular one of a plurality of meeting rooms;
request the information processing apparatus for reservation information with the acquired identification information of the meeting room;
display the requested reservation information; and
display a button for accepting the start of use in a case in which no reservation is present for the current time, and
the second circuitry is configured to request the terminal apparatus to display the first button and the second button in response to pressing of the button for accepting the start of use.

4. The resource reservation system of claim 1, wherein in a case in which, of two successive reservation information, an end time of an earlier reservation information matches the start time of a later reservation information, and the two successive reservation information includes a same reservation-making user or a same participant, the second circuitry is configured to permit the start of use of the resource in the later reservation information at a predetermined timing.

5. The resource reservation system of claim 1, wherein in a case in which the second circuitry advances the start time of a reservation of the next reservation information after the time when the use start request is received, the second circuitry is configured to advance the start time to the time when the use start request is received.

6. A method for controlling resource reservation performed by an information processing apparatus, the method comprising:
receiving a reservation information request from a terminal apparatus communicably connected to the information processing apparatus for reservation information associated with a resource, the reservation information request including resource identification information extracted from an image code displayed at a location of the resource that is captured by the terminal apparatus, the resource identification information being extracted by first circuitry of the terminal apparatus by decoding the captured image code;
transmitting the reservation information associated with the resource corresponding to the extracted resource identification information to the terminal apparatus;
receiving a use start request from the terminal apparatus, the use start request being a request to star using the resource, and including user identification information of a user of the terminal apparatus;
determining whether the user identification information included in the use start request matches user identification information included in next reservation information corresponding to a reservation to use a resource identified by the next reservation information that is scheduled after a time when the use start request is received;
sending a display request to the terminal apparatus, in a case in which the user identification information included in the use start request matches the user identification information included in the next reservation information and the resource is not reserved for a current time, to request display of a reservation information screen including a reservation-time field and a first button, the first button being operable by the user to transmit the use start request for starting use of the resource earlier than a scheduled time in the next reservation information, wherein
the first circuitry, in response to receiving the display request, displays the reservation information screen and the first button on a display of the terminal apparatus, and transmits the use start request to the information processing apparatus in response to a user operation of the displayed first button,
advancing, in response to receiving the use start request from the terminal apparatus, a start time of the reservation corresponding to the next reservation information, and advancing an end time of the reservation of the next reservation information after the current time by a same time period as a time period by which the start time is advanced;
updating the next reservation information to indicate the start of using the resource identified by the next reservation information in which the start time is advanced; and
sending the updated next reservation information to the terminal apparatus, wherein
the first circuitry updates the reservation information screen to display the advanced start time and the advanced end time of the reservation in the reservation-time field.

7. A non-transitory computer-executable medium storing a program storing instructions, when executed by an information processing apparatus, that cause the information processing apparatus to:
receive a reservation information request from a terminal apparatus communicably connected to the information processing apparatus for reservation information associated with a resource, the reservation information request including resource identification information extracted from an image code displayed at a location of the resource that is captured by the terminal apparatus, the resource identification information being extracted by first circuitry of the terminal apparatus by decoding the captured image code;

transmit the reservation information associated with the resource corresponding to the extracted resource identification information to the terminal apparatus;

receive a use start request from the terminal apparatus, the use start request being a request to start using the resource, and including identification information of a user of the terminal apparatus;

determine whether the user identification information included in the use start request matches user identification information included in next reservation information corresponding to a reservation to use a resource identified by the next reservation information that is scheduled to start after a time when the use start request is received;

send a display request to the terminal apparatus, in a case in which the user identification information included in the use start request matches the user identification information included in the next reservation information and the resource is not reserved for a current time, to request display of a reservation information screen including a reservation-time field and a first button, the first button being operable by the user to transmit the use start request for starting use of the resource earlier than a scheduled time in the next reservation information, wherein the first circuitry, in response to receiving the display request, displays the reservation information screen and the first button on a display of the terminal apparatus, and transmits the use start request to the information processing apparatus in response to a user operation of the displayed first button, advance, in response to receiving the use start request from the terminal apparatus, a start time of the reservation corresponding to the next reservation information, and advancing an end time of the reservation of the next reservation information after the current time by a same time period as a time period by which the start time is advanced;

update the next reservation information to indicate the start of using the resource identified by the next reservation information in which the start time is advanced; and sending the updated next reservation information to the terminal apparatus, wherein the first circuitry updates the reservation information screen to display the advanced start time and the advanced end time of the reservation in the reservation-time field.

\* \* \* \* \*